(12) United States Patent
Koo et al.

(10) Patent No.: US 9,219,530 B2
(45) Date of Patent: Dec. 22, 2015

(54) METHOD AND APPARATUS FOR SIGNAL TRANSMISSION IN COMP SCHEME

(75) Inventors: Ja Ho Koo, Anyang-si (KR); Yeong Hyeon Kwon, Anyang-si (KR); Jian Xu, Anyang-si (KR); Sung Ho Moon, Anyang-si (KR); Bin Chul Ihm, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 508 days.

(21) Appl. No.: 13/376,130

(22) PCT Filed: Jun. 7, 2010

(86) PCT No.: PCT/KR2010/003644
§ 371 (c)(1),
(2), (4) Date: Dec. 2, 2011

(87) PCT Pub. No.: WO2010/140872
PCT Pub. Date: Dec. 9, 2010

(65) Prior Publication Data
US 2012/0087273 A1 Apr. 12, 2012

Related U.S. Application Data

(60) Provisional application No. 61/184,314, filed on Jun. 5, 2009.

(30) Foreign Application Priority Data

Dec. 9, 2009 (KR) ........................ 10-2009-0121787

(51) Int. Cl.
*H04B 7/02* (2006.01)
*H04B 7/155* (2006.01)
(Continued)

(52) U.S. Cl.
CPC .............. *H04B 7/024* (2013.01); *H04W 16/02* (2013.01); *H04B 7/15592* (2013.01); *H04L 5/0007* (2013.01); *H04W 8/183* (2013.01)

(58) Field of Classification Search
CPC ... H04B 7/024; H04B 7/15592; H04W 16/02; H04W 7/04; H04W 7/042; H04W 7/044; H04W 8/183; H04L 5/0007
USPC ................................................ 370/252, 329
See application file for complete search history.

(56) References Cited

U.S. PATENT DOCUMENTS 8,150,399 B2 * 4/2012 Wong et al. .................... 455/443
8,654,625 B2 * 2/2014 Kwon et al. ................... 370/208
(Continued)

OTHER PUBLICATIONS

S. Parkvall, et al., "LTE-Advanced—Evolving LTE towards IMT-Advanced", Ericsson Research 16480 Stockholm, Sweden, Stefan. Parkvall@ericsson.com, IEEE 68th Vehicular Technology Conference 2008, pp. 1-5, Sep. 24, 2008.
(Continued)

*Primary Examiner* — Asad Nawaz
*Assistant Examiner* — Kai Chang
(74) *Attorney, Agent, or Firm* — Dentons US LLP

(57) ABSTRACT

The present system relates to a method for signal transmission in a CoMP scheme. Each cell that performs a CoMP operation in capable of setting and allocating a particular carrier and a particular CoMP zone in order to execute a particular CoMP scheme. Using the particular CoMP zone and the allocated carrier, a terminal can transmit and receive a CoMP signal corresponding to the particular CoMP zone and the allocated carrier. The terminal can perform measurement of a carrier or a particular zone within the carrier and select a carrier or a particular zone, on the basis of the measurement value. On the other hand, a serving base station can select a carrier or a particular zone, on the basis of the measurement value that is received from the terminal.

12 Claims, 22 Drawing Sheets

(51) Int. Cl.
*H04W 16/02* (2009.01)
*H04W 8/18* (2009.01)
*H04L 5/00* (2006.01)

(56) References Cited

U.S. PATENT DOCUMENTS

| | | | |
|---|---|---|---|
| 8,781,485 B2* | 7/2014 | Kwon et al. | 455/450 |
| 8,804,635 B2* | 8/2014 | Kwon et al. | 370/329 |
| 8,942,165 B2* | 1/2015 | Palanki et al. | 370/328 |
| 9,094,167 B2* | 7/2015 | Zhang et al. | 1/1 |
| 2010/0135242 A1* | 6/2010 | Nam et al. | 370/330 |
| 2010/0167717 A1* | 7/2010 | Hafeez et al. | 455/422.1 |
| 2010/0239036 A1* | 9/2010 | Koo et al. | 375/260 |
| 2010/0272032 A1* | 10/2010 | Sayana et al. | 370/329 |
| 2010/0272218 A1* | 10/2010 | Yeh et al. | 375/330 |
| 2010/0279628 A1* | 11/2010 | Love et al. | 455/70 |
| 2011/0103287 A1* | 5/2011 | Ma et al. | 370/312 |
| 2011/0292903 A1* | 12/2011 | Jongren et al. | 370/329 |
| 2011/0292906 A1* | 12/2011 | Ren et al. | 370/329 |
| 2012/0002635 A1* | 1/2012 | Chung et al. | 370/329 |

OTHER PUBLICATIONS

D. Astély, et al., "LTE: The Evolution of Mobile Broadband", LTE Part II: 3GPP Release 8, IEEE Communication Magazine, vol. 47, No. 4, pp. 44-51, Apr. 2009.

\* cited by examiner

METHOD AND APPARATUS FOR SIGNAL TRANSMISSION IN COMP SCHEME

This application is a 35 U.S.C. §371 National Stage entry of International Application No. PCT/KR2010/003644, filed on Jun. 7, 2010, and claims the benefit of priority of U.S. Provisional application No. 61/184,314 filed on Jun. 5, 2009 and Korean Patent application No. 10-2009-0121787 filed on Dec. 9, 2009, all of which are incorporated by reference in their entirety herein.

TECHNICAL FIELD

The present invention relates to a method and apparatus for signal transmission in a CoMP scheme.

BACKGROUND ART

Recently, a multiple input multiple output (MIMO) system has received much attention as a broadband wireless communication technology. The MIMO system means a system that enhances communication efficiency of data by using a plurality of antennas. The MIMO system can be divided into a spatial multiplexing scheme and a spatial diversity scheme depending on transmission of same data.

The spatial multiplexing scheme means a scheme that can transmit data at high rate without even increasing a system bandwidth by simultaneously transmitting different data through a plurality of transmitting antennas. The spatial multiplexing scheme means a scheme that can obtain transmission diversity by transmitting same data from a plurality of transmitting antennas. An example of the spatial diversity scheme includes a space time channel coding scheme.

Also, the MIMO system can be divided into an open loop system and a closed loop system depending on feedback of channel information from a receiving side to a transmitting side. An example of the open loop system includes a space-time trellis code (STTC) system in which a transmitting side transmits information in parallel while a receiving side detects a signal by repeatedly using a zero forcing (ZF) scheme and a minimum mean square error (MMSE) scheme and obtains transmission diversity and encoding gain by using a blast and spatial area that can increase information as much as the number of transmitting antennas. An example of the closed loop system includes a transmit antenna array (TxAA) system.

A coordinated multi-point system (hereinafter, referred to as 'CoMP system') is the system for improving throughput of a user located at the cell edge by applying improved MIMO transmission under the multi-cell environment. If the CoMP system is applied, inter-cell interference can be reduced under the multi-cell environment. In case of the CoMP system, a user equipment can commonly be supported with data from multi-cell base stations.

Also, each base station can improve system throughput by supporting same radio frequency resource to one or more user equipments UE1, UE2, . . . , UE K at the same time. Also, the base station can perform a space division multiple access (SDMA) method based on channel state information (CSI) between the base station and the user equipment.

The CoMP system can be divided into a coordinated MIMO (Co-MIMO) type joint processing (JP) scheme through data sharing and a coordinated scheduling scheme/beamforming (CS/CB) scheme.

FIG. 1 is a conceptional diagram illustrating a CoMP system of intra eNBs and an inter eNB according to the related art.

Referring to FIG. 1, intra base stations 110, 120 and inter base station 130 exist under a multi cell environment. According to a long term evolution (LTE) system, the intra base stations include several cells (or sectors). Cells that belong to a base station to which a specific user equipment belongs are in the relation of intra base stations 110, 120 with a user equipment. Namely, cells that share a base station to which a user equipment belongs are those corresponding to the intra base stations 110 and 120 while cells that belong to other base stations are those corresponding to the inter base station 130. In this way, although cells based on the same base station as that of a specific user equipment transmit and receive information (for example, data, channel state information (CSI)) through x2 interface, cells based on a base station different from that of a specific user equipment can transmit and receive information through a backhaul 140.

As illustrated in FIG. 1, a single cell MIMO user 150 located within a single cell may perform communication with a single serving base station in one cell (sector), and a multi-cell MIMO user 160 located at the cell edge may perform communication with a plurality of serving base stations in multiple cells (sectors).

DISCLOSURE

Technical Problem

An object of the present invention devised to solve the conventional problem is to provide a method for transmitting signal at a user equipment in a CoMP scheme.

Another object of the present invention is to provide a method for setting up a CoMP zone for operation in a CoMP scheme.

Other object of the present invention is to provide a user equipment for transmitting a signal using a CoMP scheme.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, a method for transmitting signal using a coordinated multi-point (CoMP) scheme of a user equipment comprises the steps of receiving information of one or more carriers or one or more specific zones per carrier, which are allocated for an operation of a specific CoMP scheme, from a serving base station; and transmitting a signal in accordance with a corresponding CoMP scheme using the allocated one or more carriers or the one or more specific zones per carrier.

In another aspect of the present invention, a user equipment for transmitting a signal in a wireless communication system in accordance with a CoMP scheme comprises a reception module configured to receive information of one or more carriers or one or more specific zones per carrier, which are allocated for an operation of a specific CoMP scheme, from a serving base station; and a transmission module configured to transmit a signal in accordance with a corresponding CoMP scheme using the allocated one or more carriers or the one or more specific zones per carrier.

In this case, the transmission module may transmit a signal of a first CoMP scheme by using a first carrier, which is allocated, and may transmit a signal of a second CoMP scheme by using a second carrier.

Also, the transmission module may transmit a signal of a first CoMP scheme using a specific zone of a first one of the allocated carriers, and may transmit a signal of a second CoMP scheme using a specific zone of a second carrier.

The transmission module may transmit signals of first and second CoMP schemes using a full band of a specific carrier of the allocated carriers. The transmission module may transmit signals of first and second CoMP schemes using a specific zone in a specific one of the allocated carriers.

Advantageous Effects

According to the embodiments of the present invention, if a signal is transmitted using a carrier set for operation in a CoMP scheme, i.e., a specific CoMP zone, a CoMP operation can be performed efficiently.

Also, as a specific carrier according to the present invention, i.e., a CoMP zone is used, overhead based on feedback information transmission of the user equipment and scheduling overhead can be reduced.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system of a 3GPP LTE system, the following description may be applied to other mobile communication systems except for unique features of the 3GPP LTE system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment means a mobile or fixed type user terminal such as a mobile station (MS). It is also assumed that a base station means a random node of a network node, such as Node B and eNode B, which performs communication with a user equipment.

In the mobile communication system, a user equipment may receive information from a base station through a downlink. Also, the user equipment may transmit information through an uplink. Examples of information transmitted from and received by the user equipment include data and various kinds of control information. Various physical channels exist depending on types of information transmitted from or received by the user equipment.

Figure 1:
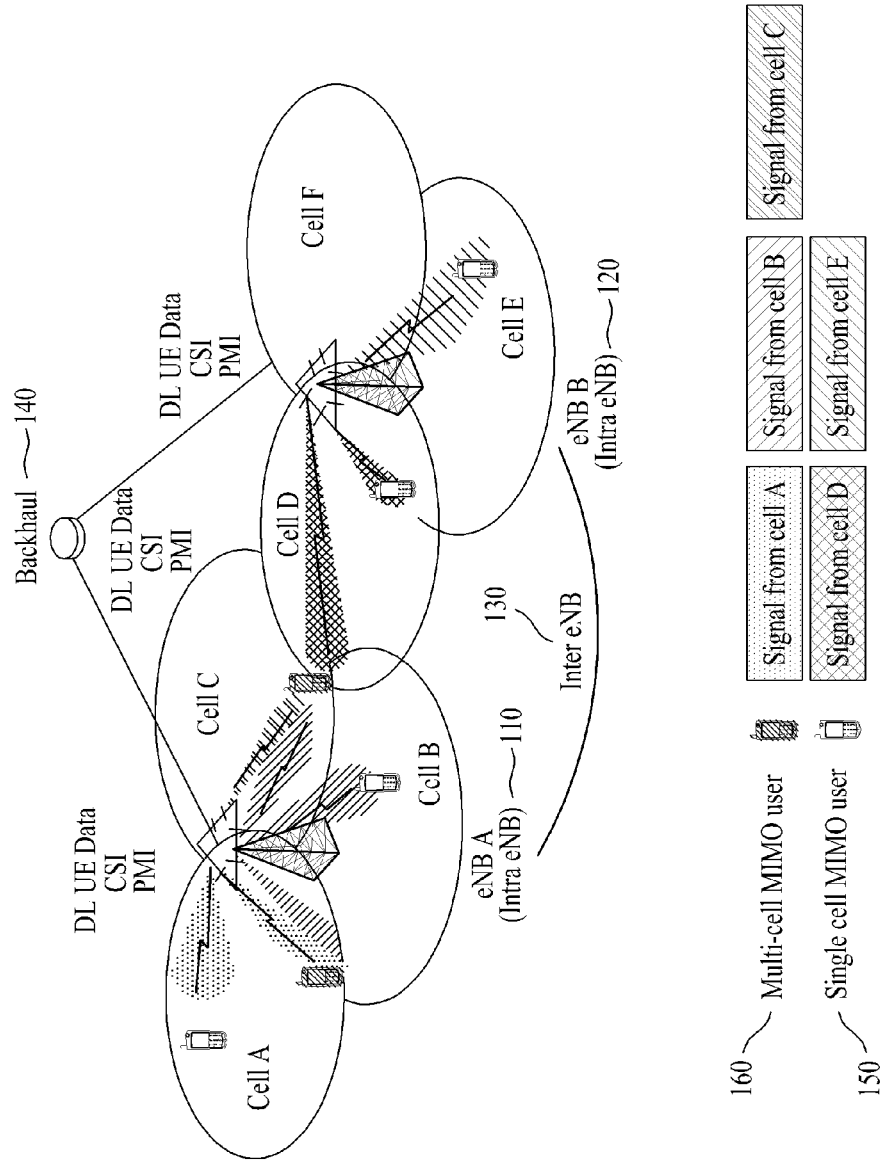
FIG. 1 is a conceptional diagram illustrating a CoMP system of intra eNBs and an inter eNB according to the related art.
Figure 2:
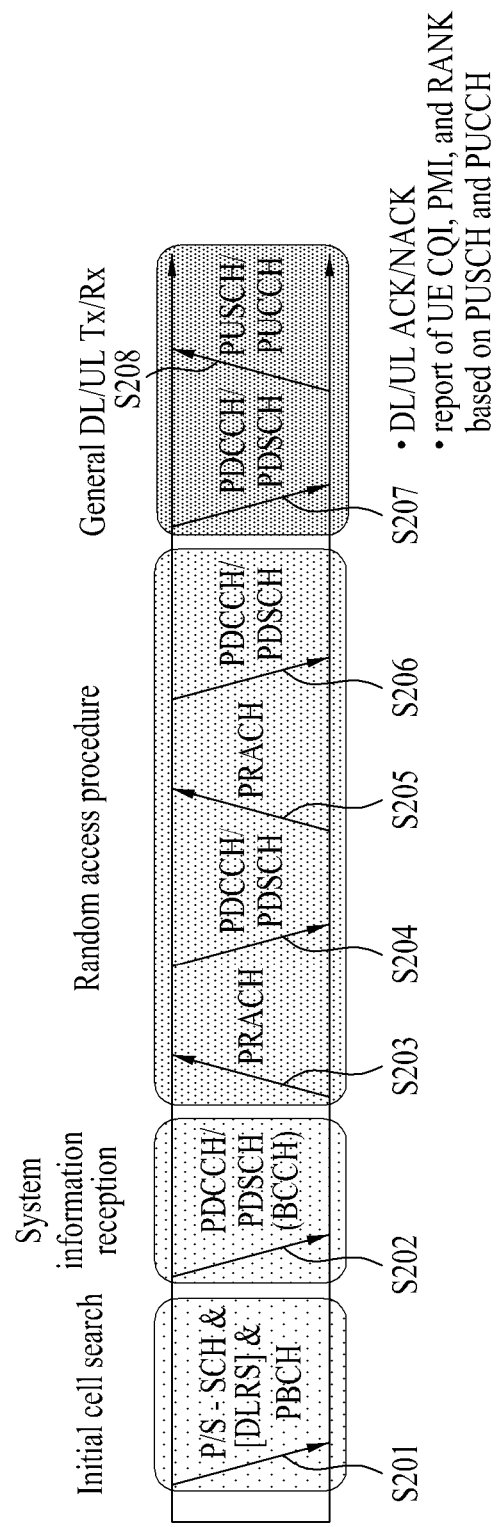
FIG. 2 is a diagram illustrating physical channels used in a $3^{rd}$ generation partnership project long term evolution (3GPP) system, which is an example of a mobile communication system, and a general method for transmitting a signal using the physical channels.

FIG. 2 is a diagram illustrating physical channels used in a $3^{rd}$ generation partnership project long term evolution (3GPP) system, which is an example of a mobile communication system, and a general method for transmitting a signal using the physical channels.

Referring to FIG. 2, the user equipment performs initial cell search such as synchronizing with the base station when it newly enters a cell or the power is turned on in step S201. To this end, the user equipment synchronizes with the base station by receiving a primary synchronization channel (P-SCH) and a secondary synchronization channel (S-SCH) from the base station, and acquires information of cell ID, etc. Afterwards, the user equipment may acquire broadcast information within a cell by receiving a physical broadcast channel from the base station. Meanwhile, the user equipment may identify the channel status of a downlink by receiving a downlink reference signal (DL RS) in the initial cell search step.

The user equipment which has finished the initial cell search may acquire more detailed system information by receiving a physical downlink control channel (PDCCH) and a physical downlink control channel (PDSCH) according to the physical downlink control channel information (S202).

Meanwhile, if the user equipment initially accesses the base station, or if there is no radio resource for signal transmission, the user equipment may perform a random access procedure (RACH) for the base station, such as step S203 to S206. To this end, the user equipment may transmit a preamble of a specific sequence through a random physical random access channel (PRACH) (S203), and may receive a response message to the random access through the PDCCH and a PDSCH corresponding to the PDCCH (S204). In case of contention based random access except for handover, a contention resolution procedure such as transmission (S205) of PRACH and reception (S206) of PDCCH/PDSCH may be performed additionally.

The user equipment which has performed the aforementioned steps receives the PDCCH/PDSCH (S207) and transmits a physical uplink shared channel (PUSCH) and a physical uplink control channel (PUCCH) (S208), as a general procedure of transmitting uplink/downlink signals. The control information transmitted from the user equipment to the base station or received from the base station to the user equipment through the uplink includes downlink/uplink ACK/NACK signals, channel quality information (CQI), a precoding matrix index (PMI), and a rank indicator (RI). In case of the 3GPP LTE system, the user equipment may transmit control information such as the aforementioned CQI/PMI/RI through the PUSCH and/or the PUCCH.

In the present invention, the terminology, base station may be referred to as a cell or sector if it is used as a geographical concept. The serving base station (or cell) may be regarded as a base station (or cell) that provides a main service to the user equipment, and may perform transmission and reception of control information on a coordinated multiple transmission point. In this respect, the serving base station (or cell) may be referred to as an anchor base station (or anchor cell). The serving base station may transmit various kinds of information, which are received from the user equipment, to a neighboring base station (cell). Likewise, the neighboring base station may be referred to as a neighboring cell if it is used as a geographical concept. 'Measurement information' of the user equipment, which is used in the present invention, may include L3 measurement information such as reference signal received power (RSRP) and reference signal received quality (RSRQ) and information on the channel status such as short-term fading.

If a CoMP system is used under the multi-cell environment, communication throughput of a user equipment at the cell edge may be improved. Examples of the CoMP system include a coordinated MIMO type joint processing (JP) scheme, a coordinated scheduling/beamforming (CS/CB) scheme for reducing inter-cell interference such as worst companion and best companion, and a geographical transmission process (for example, multi-antenna) scheme.

Particularly, the coordinated scheduling/beamforming (CS/CB) scheme is to reduce inter-cell interference in such a manner that the user equipment transmits restricted and/or recommended PMI to the serving base station to reduce interference from a neighboring cell. In this case, according to the worst companion scheme, as the user equipment reports a PMI having the greatest interference for cells that perform a CoMP operation to the serving base station, the corresponding neighboring cells may remove inter-cell interference by using suboptimal PMI except for the PMI having the greatest interference. According to the best companion scheme, as the user equipment reports a PMI having the smallest interference for cells that perform a CoMP operation to the serving base station, the corresponding neighboring cells may remove inter-cell interference by using the PMI having the smallest interference.

If such a CoMP system is used, the user equipment may be supported with data from multi-cell base stations commonly. In other words, communication throughput of the user equipment at the cell edge may be improved by the CoMP operation under the multi-cell environment.

In order to efficiently perform the multi-cell based CoMP operation system such as the joint processing scheme and the coordinated scheduling/beamforming (CS/CB) scheme, i.e., in order to reduce feedback overhead and scheduling overhead, the user equipment may set a specific zone (for example, 'CoMP zone') of resource regions (frequency domain). In other words, a specific physical resource block (PRB) for a CoMP operation is set, so that the user equipment that performs the CoMP operation may measure the channel status of the CoMP zone and feed back the measured result. Namely, since the user equipment has only to feed back measurement information on the CoMP zone corresponding to a specific frequency band of frequency bands, scheduling information to be transmitted between cells that perform the CoMP operation may be reduced.

This method for setting up (or allocating) a CoMP zone is useful in case of the joint processing (JP) scheme in which a plurality of cells that generally performs the CoMP operation may transmit a desirable signal to the user equipment. However, scheduling information may be reduced in a beam cooperative process between the respective cells by using a scheme that allocates a specific user equipment to a specific frequency band even in case of the cooperative scheduling/beamforming (CS/CB) scheme, which is intended to reduce multi-cell interference, as well as the joint processing scheme of the CoMP scheme.

Also, examples of the method for setting up a CoMP zone include a cell-specific setup scheme and a user equipment-specific setup scheme. According to the cell-specific setup scheme, a cell specific CoMP zone is allocated to each cell regardless of a user equipment in a corresponding cell. On the other hand, according to the user equipment-specific setup scheme, cells that perform the CoMP operation together with a user equipment at the cell edge set up a specific CoMP zone for the corresponding user equipment.

In case of the user equipment-specific setup scheme of the CoMP zone, the user equipment may set up a CoMP zone having a good channel status. In setting up a user equipment-specific CoMP zone, the user equipment may set up different CoMP zones depending on a single cell based operation and a multi-cell based operation. In other words, in case of the cooperative scheduling/beamforming (CS/CB) scheme that receives a desirable signal from a serving cell, the user equipment may select a CoMP zone through a single cell based best band selection method (this means that a CoMP zone is allocated for the cooperative scheduling/beamforming (CS/CB) scheme). However, in case of the joint processing scheme that performs RF combining, the user equipment may select the best band based on an effective CQI according to the channel status between neighboring cells joining in joint processing, unlike a single cell, and may set the selected band as a CoMP zone.

If the user equipment located at the cell edge is operated in a CoMP scheme different from that of neighboring cells simultaneously with the neighboring cells, the serving base station may notify the user equipment whether a neighboring cell that performs a CoMP operation is operated in accordance with the joint processing scheme or the cooperative scheduling/beamforming scheme, to set up a user equipment-specific CoMP zone. If the user equipment located at the cell edge is operated in accordance with one CoMP scheme, the serving base station may notify the user equipment of information on the CoMP scheme currently used to set up the user equipment-specific CoMP zone.

Hereinafter, various embodiments for setting up a specific carrier or a specific CoMP zone by performing measurement per downlink component carrier or CoMP zone will be described.

Figure 3:
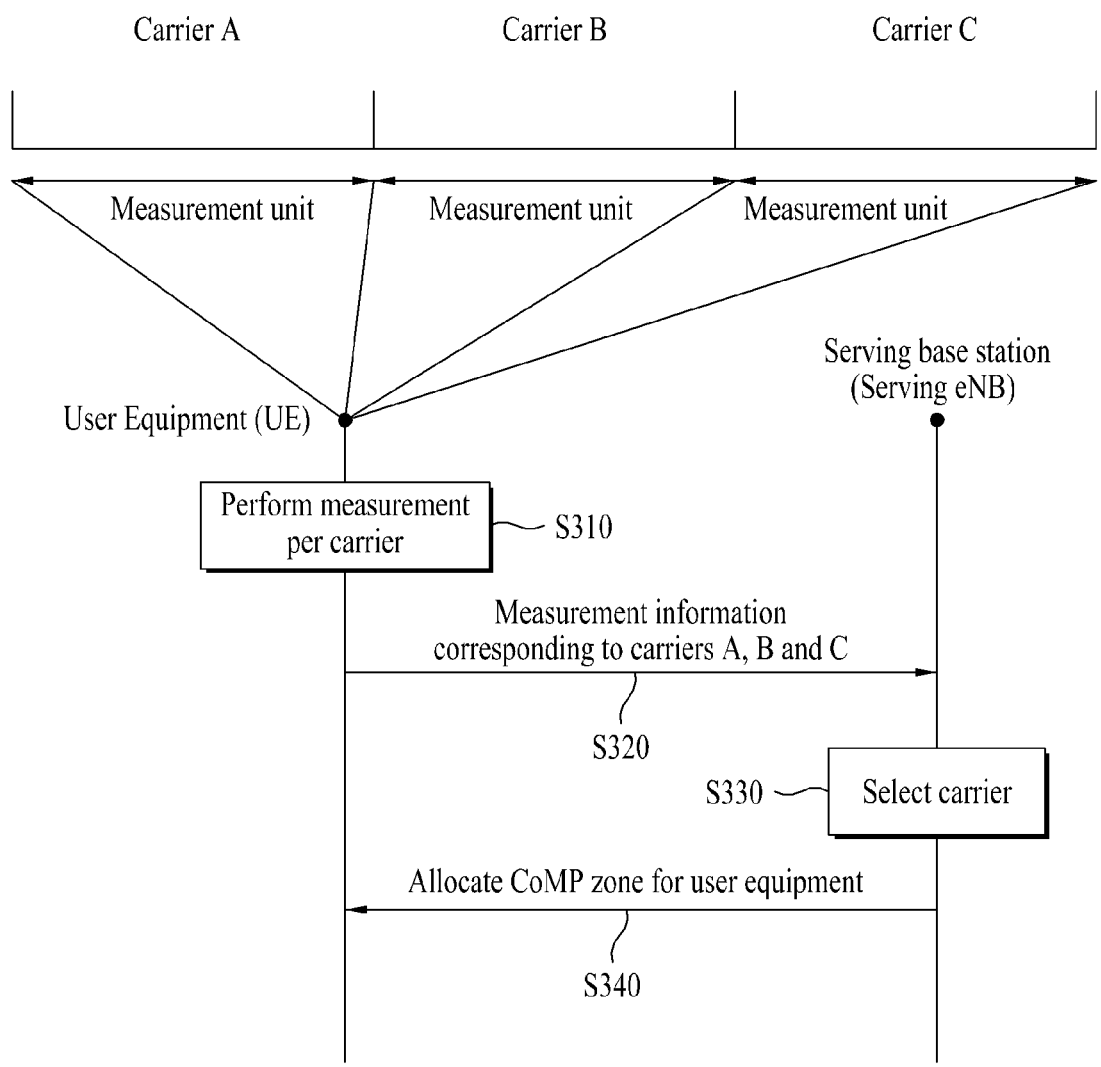
FIG. 3 is a diagram illustrating an example of a method for allocating a CoMP zone from a serving base station.

FIG. 3 is a diagram illustrating an example of a method for allocating a CoMP zone from a serving base station.

Referring to FIG. 3, a user equipment performs measurement such as a channel status per carrier (S310). In this case, the measured result may be referred to as measurement information, and the measurement information may include reference signal received power (RSRP) and reference signal received quality (RSRQ). The user equipment may transmit measurement information on a full band of each carrier. In other words, a measurement unit is a carrier. Afterwards, the user equipment transmits the measurement information (for example, RSRP and RSRQ) to the serving base station (S320). The serving base station may select a carrier having the greatest interference or the smallest interference from neighboring cells on the basis of the received measurement information (S330). Then, the serving base station may allocate a CoMP zone belonging to the selected carrier to the user equipment.

Figure 4:
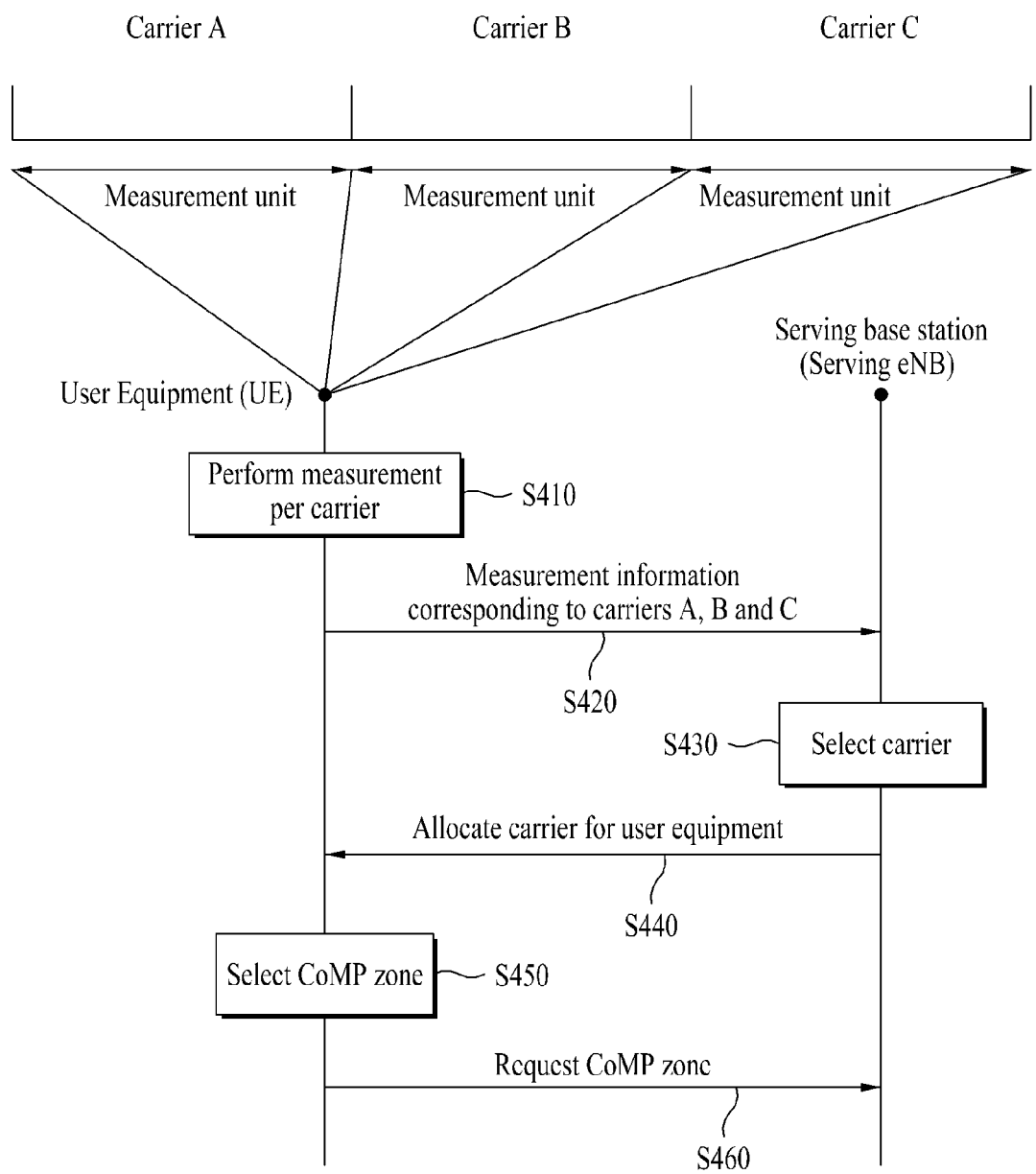
FIG. 4 is a diagram illustrating an example of a method for allocating a CoMP zone from a serving base station.

FIG. 4 is a diagram illustrating an example of a method for allocating a CoMP zone from a serving base station.

Referring to FIG. 4, in the same manner as FIG. 3, a user equipment performs measurement such as a channel status per carrier (S410), and transmits measurement information to the serving base station (S420). Afterwards, the serving base station may select a carrier having the greatest interference or the smallest interference from neighboring cells on the basis of the received measurement information (S430). And, the serving base station may allocate the selected carrier to the user equipment (S440). Unlike FIG. 3, the user equipment may select a CoMP zone, which is a specific frequency band, from the allocated carrier (S450). At this time, the user equipment may select the best band having an excellent channel status from the carrier allocated from the serving base station (S450). If neighboring cells transmit an undesirable signal to cell edge user equipments within a serving cell, the signal may serve as interference. However, if the neighboring cells transmit a desirable signal through inter-cell sharing, the great interference signal may be a signal having a good channel status. Accordingly, in case of the joint processing scheme, it is effective that the user equipment selects the carrier having great interference. Also, in case of the cooperative scheduling/beamforming (CS/CB) scheme, it is desirable that the user equipment selects the carrier having small interference from neighboring cells. The user equipment may request the serving base station to allocate the selected CoMP zone (S470).

Figure 5:
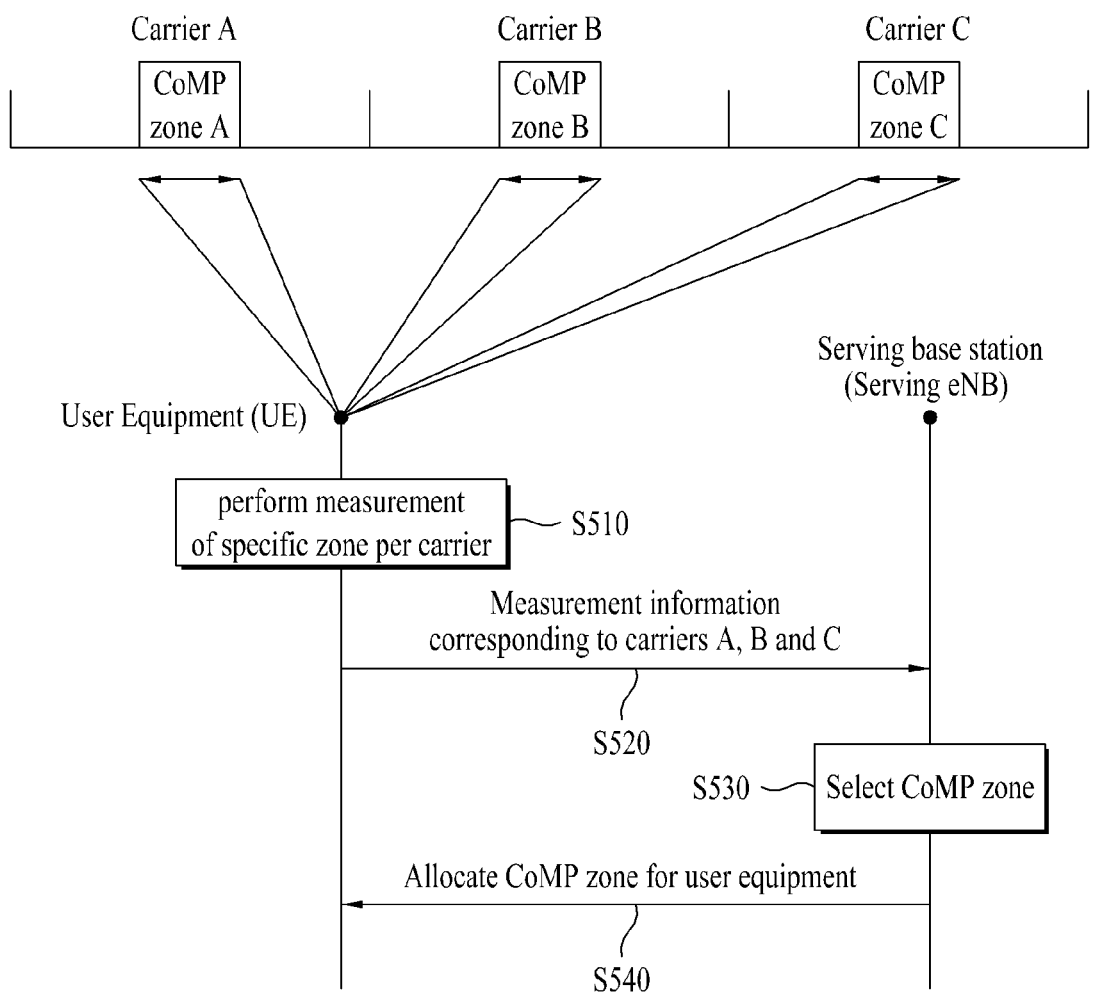
FIG. 5 is a diagram illustrating an example of a method for allocating a CoMP zone from a serving base station.

FIG. 5 is a diagram illustrating an example of a method for allocating a CoMP zone from a serving base station.

Referring to FIG. 5, unlike the examples of FIG. 3 and FIG. 4, the user equipment performs measurement such as a channel status for a CoMP zone only which is a specific frequency band existing in each carrier (S510). Afterwards, the user equipment transmits measurement information on the CoMP zone existing in each carrier to the serving base station (S520). Then, the serving base station may select a CoMP zone having the greatest interference or the smallest interference from neighboring cells on the basis of the received measurement information (S530). And, the serving base station may allocate the selected CoMP zone to the corresponding user equipment (S540).

Figure 6:
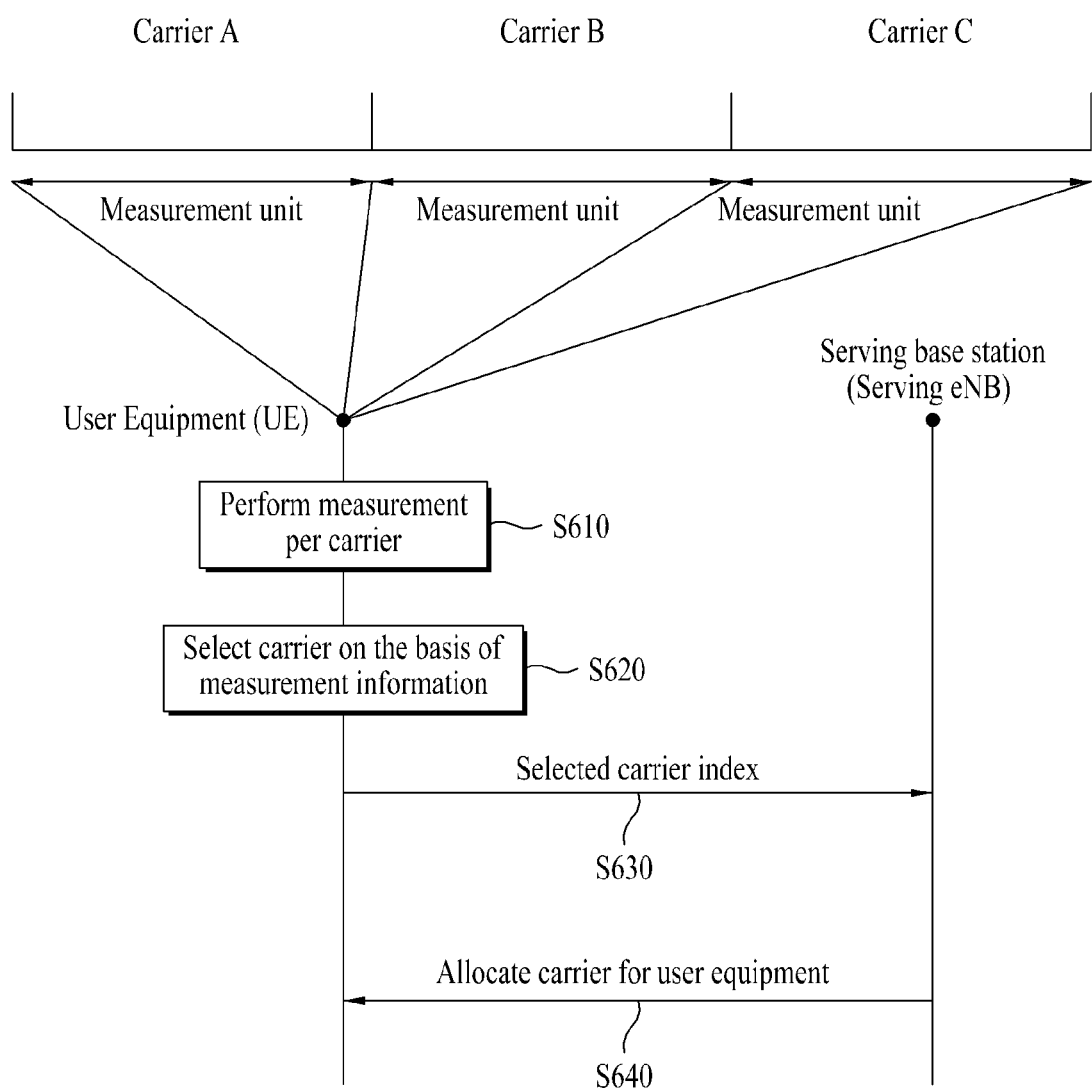
FIG. 6 is a diagram illustrating an example of a method for allocating a CoMP zone from a serving base station.

FIG. 6 is a diagram illustrating an example of a method for allocating a CoMP zone from a serving base station.

Referring to FIG. 6, the user equipment performs measurement such as a channel status for each carrier (S610). The user equipment may select a carrier having the greatest interference or the smallest interference from neighboring cells on the basis of the measurement information per carrier (S620). The user equipment may transmit information (for example, selected carrier index type) on the selected carrier to the serving base station (S630). Then, the serving base station may select a carrier to be allocated to the user equipment on the basis of the received information (S640).

Figure 7:
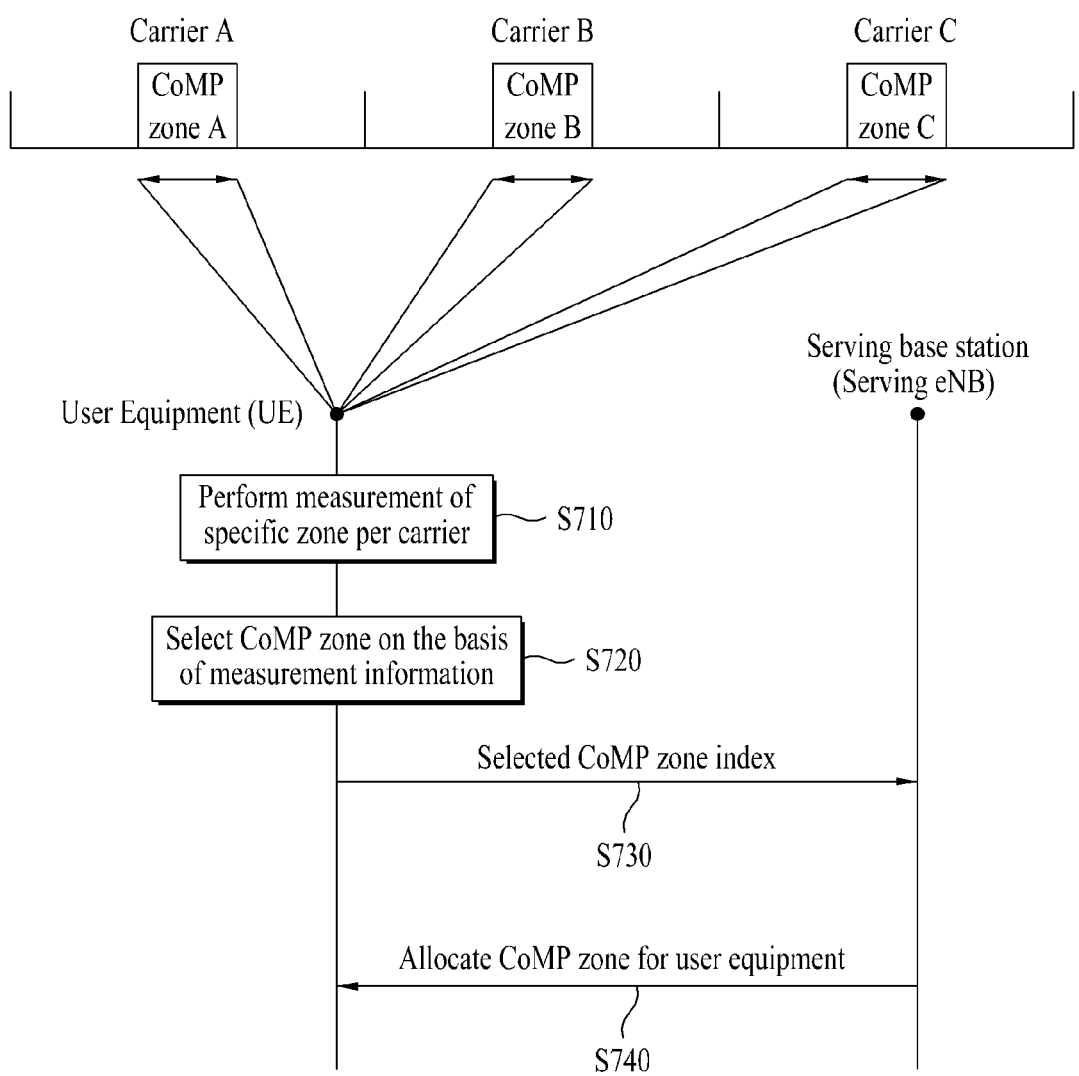
FIG. 7 is a diagram illustrating an example of a method for allocating a CoMP zone from a serving base station.

FIG. 7 is a diagram illustrating an example of a method for allocating a CoMP zone from a serving base station.

Referring to FIG. 7, unlike the example of FIG. 6, the user equipment performs measurement such as a channel status for a CoMP zone only which is a specific frequency band existing in each carrier (S710). And, the user equipment may select a CoMP zone having the greatest interference or the smallest interference from neighboring cells on the basis of the measurement information measured per carrier (S720). Afterwards, the user equipment may transmit information (for example, selected CoMP zone index type) on the selected CoMP zone to the serving base station (S730). Then, the serving base station may allocate a CoMP zone corresponding to the information on the selected CoMP zone to the user equipment (S740).

Figure 8:
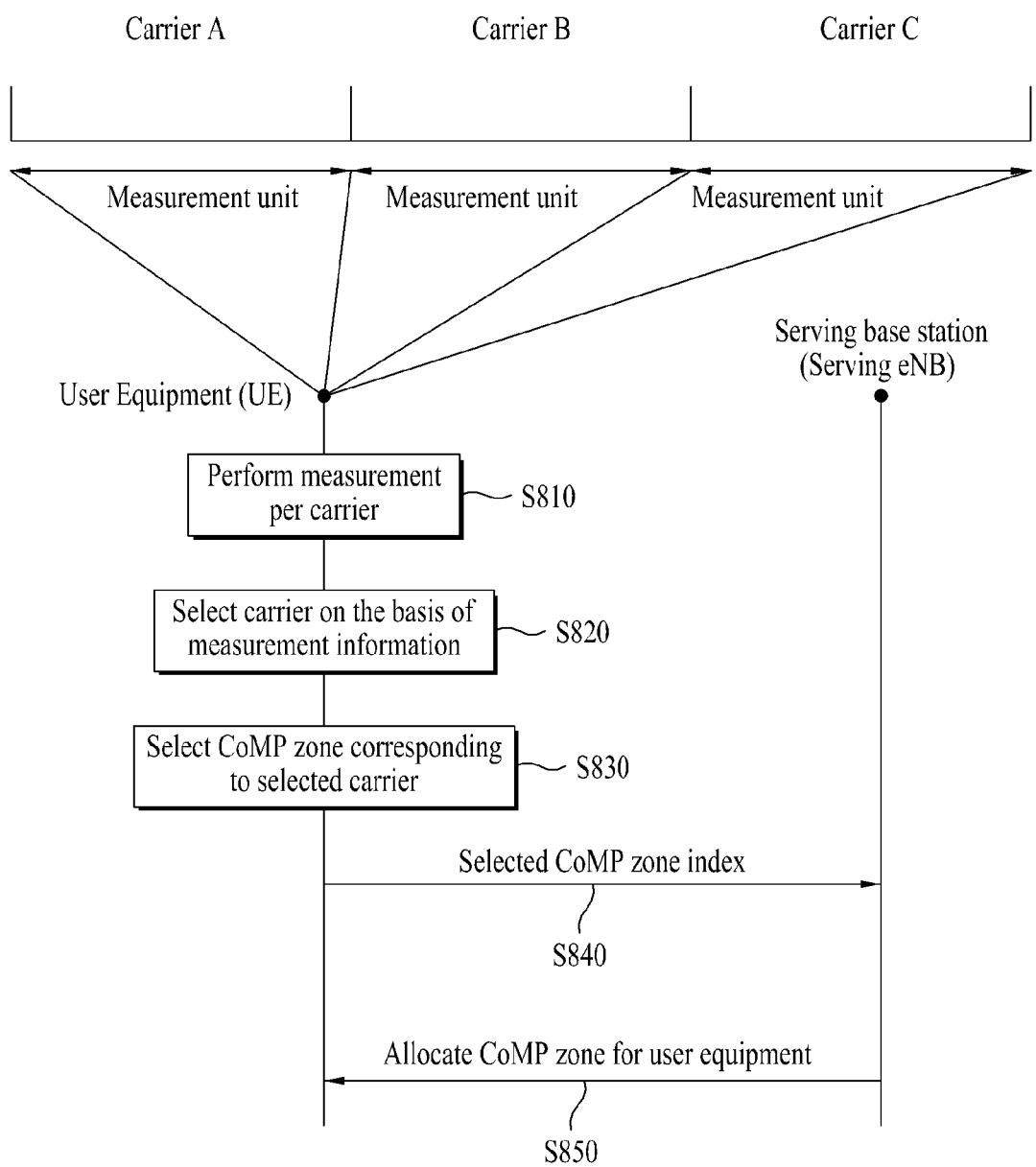
FIG. 8 is a diagram illustrating an example of a method for allocating a CoMP zone from a serving base station.

FIG. 8 is a diagram illustrating an example of a method for allocating a CoMP zone from a serving base station.

Referring to FIG. 8, the user equipment performs measurement such as a channel status for each carrier (S810). The user equipment may select a carrier having the greatest interference or the smallest interference from neighboring cells on the basis of the measurement information measured per carrier (S820). After selecting the specific carrier, the user equipment may select a CoMP zone having the greatest interference or the smallest interference from neighboring cells within the selected carrier (S830). Afterwards, the user equipment may transmit information (for example, selected CoMP zone index type) on the selected CoMP zone to the serving base station (S840). Then, the serving base station may allocate a CoMP zone corresponding to the information (for example, carrier index) on the selected CoMP zone to the user equipment (S850).

Figure 9:
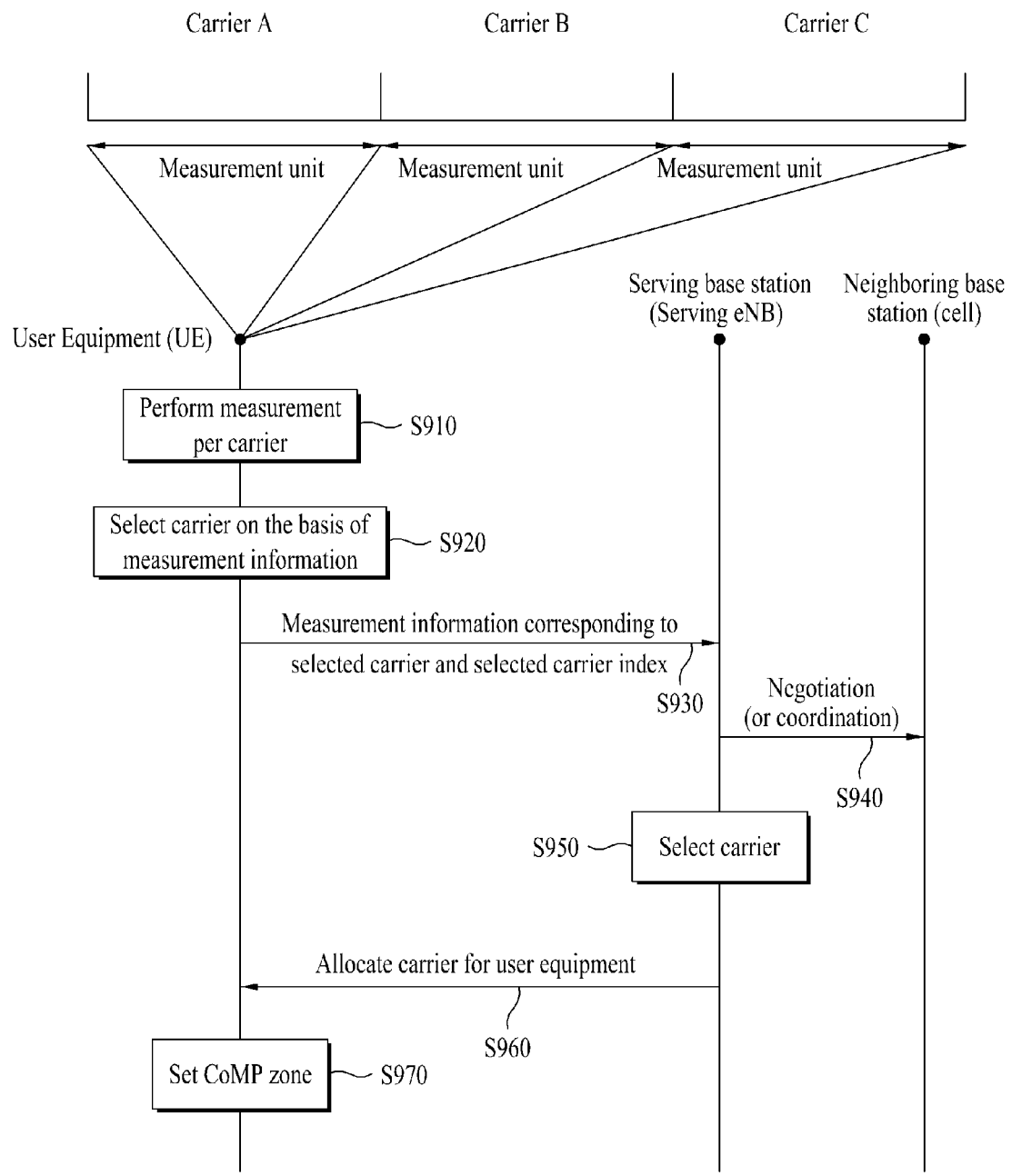
FIG. 9 is a diagram illustrating an example of a method for allocating a CoMP zone from a serving base station.

FIG. 9 is a diagram illustrating an example of a method for allocating a CoMP zone from a serving base station.

Referring to FIG. 9, the user equipment performs measurement such as a channel status for each carrier (S910). The user equipment may select a carrier having the greatest interference or the smallest interference from neighboring cells on the basis of the measurement information measured per carrier (S920). Afterwards, the user equipment may transmit measurement information corresponding to the selected carrier and index information on the selected carrier to the serving base station (S930). The serving base station may perform negotiation with a neighboring cell (S940) and then may select a specific carrier (S950). Afterwards, the serving base station may allocate the selected carrier to the user equipment (S960). The user equipment may set up a user equipment-specific CoMP zone by performing a procedure of selecting the best band having a good channel status from the carrier allocated from the serving base station (S970).

Figure 10:
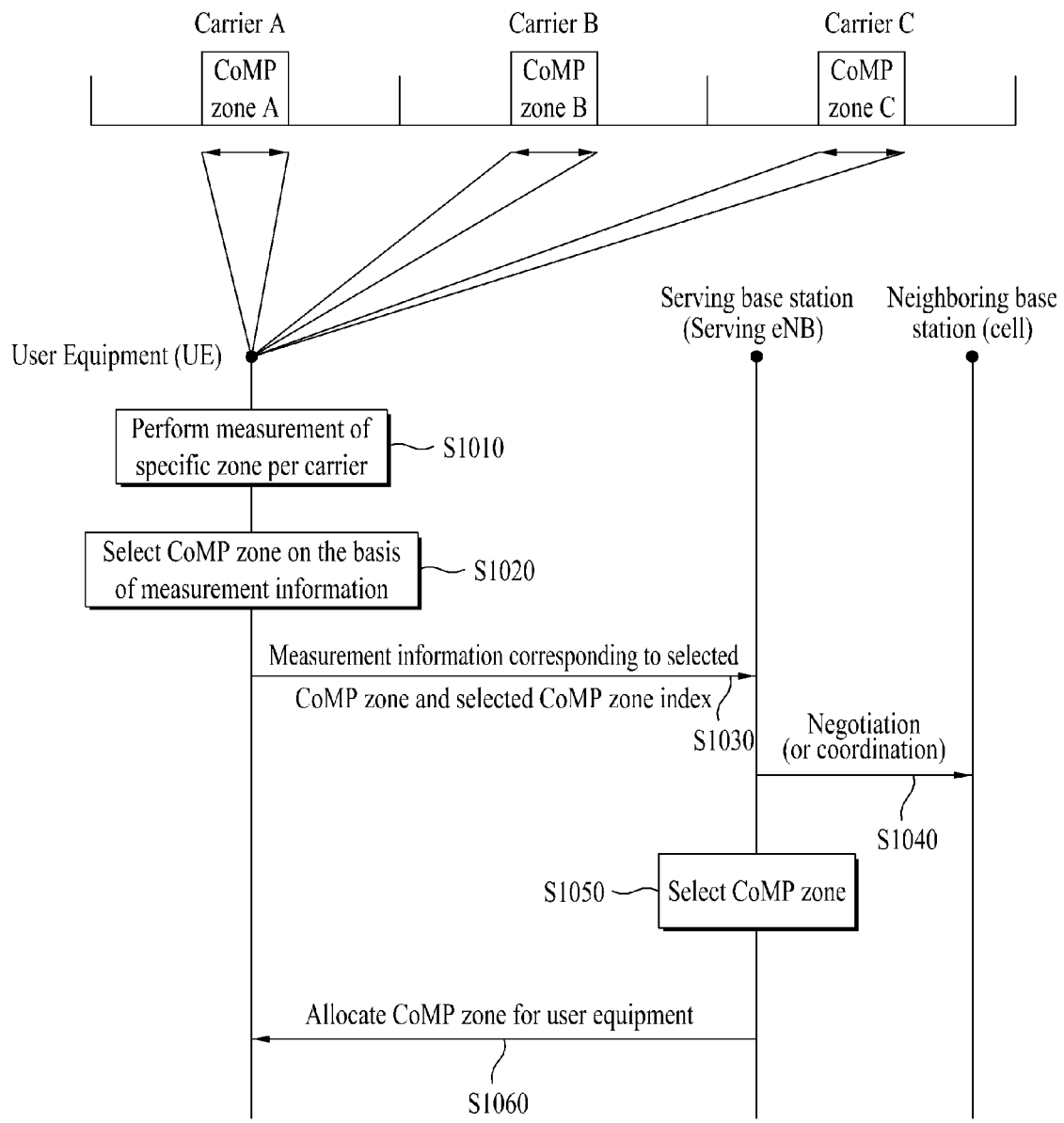
FIG. 10 is a diagram illustrating an example of a method for allocating a CoMP zone from a serving base station.

FIG. 10 is a diagram illustrating an example of a method for allocating a CoMP zone from a serving base station.

Referring to FIG. 10, the user equipment performs measurement such as a channel status for a CoMP zone only which is a specific frequency band existing in each carrier (S1010). And, the user equipment may select a CoMP zone having the greatest interference or the smallest interference from neighboring cells on the basis of the measurement information measured per carrier (S1020). Afterwards, the user equipment may transmit measurement information corresponding to the selected CoMP zone and index information on the selected CoMP zone to the serving base station (S1030). Then, the serving base station may perform negotiation with a neighboring cell (S1040) and then may select a specific CoMP zone (S1050). Afterwards, the serving base station may allocate the selected CoMP zone to the user equipment (S1060).

Figure 11:
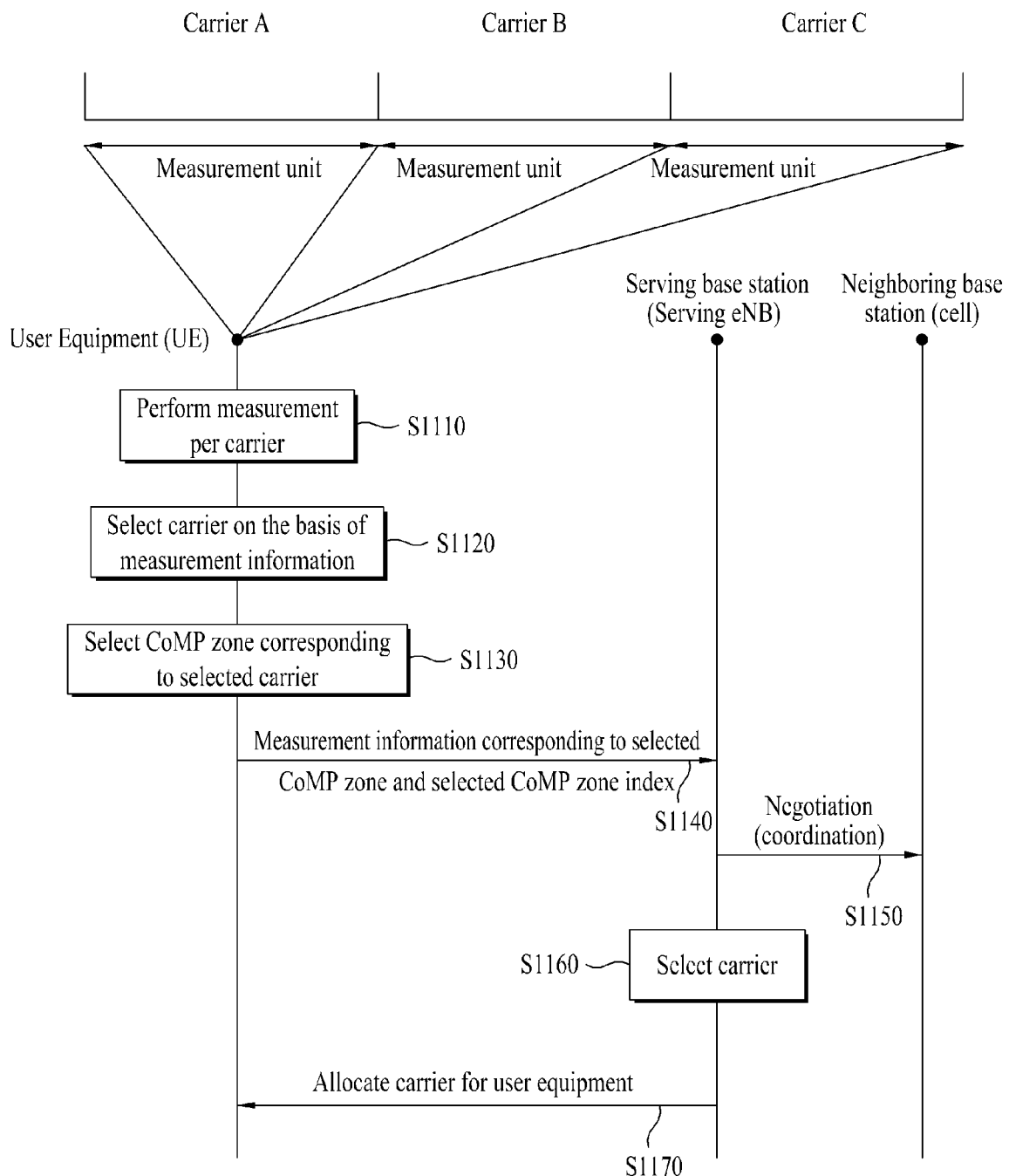
FIG. 11 is a diagram illustrating an example of a method for allocating a CoMP zone from a serving base station.

FIG. 11 is a diagram illustrating an example of a method for allocating a CoMP zone from a serving base station.

Referring to FIG. 11, the user equipment performs measurement such as a channel status for each carrier (S1110). The user equipment may select a carrier having the greatest interference or the smallest interference from neighboring cells on the basis of the measurement information measured per carrier (S1120). After selecting a specific carrier, the user equipment may select a CoMP zone corresponding to the selected carrier, i.e., a CoMP zone having the greatest interference or the smallest interference from neighboring cells (S1130). Then, the user equipment may transmit measurement information corresponding to the selected CoMP zone and index information on the selected CoMP zone to the serving base station (S1140). Afterwards, the serving base station may perform negotiation with a neighboring cell (S1150) and then may select a carrier (S1150). If the serving base station transmits information on the selected carrier to the user equipment (S1160), the user equipment may again select a specific CoMP zone on the basis of the received carrier information (S1170).

Hereinafter, when different CoMP schemes are applied to one user equipment at the same time, various embodiments for allocating a CoMP zone will be described.

The user equipment located at the cell edge may be operated in accordance with different CoMP schemes per cell at the same time to perform a CoMP operation with neighboring cells. In other words, the user equipment may perform the CoMP operation in accordance with a cooperative scheduling/beamforming scheme with a specific neighboring cell and may perform the CoMP operation in accordance with a joint processing scheme with the other neighboring cells that perform the CoMP operation. For example, the user equipment may perform the CoMP operation in accordance with the joint processing scheme with cells which are in intra base station (intra eNB) relation, and may perform the CoMP operation in accordance with the cooperative scheduling/beamforming scheme with cells which are in inter base station (inter eNB) relation. In other words, the user equipment may perform the joint processing scheme with cells within intra base station having no restriction of overhead or backhaul delay between cells, and may perform the cooperative scheduling/beamforming scheme with cells in inter base station restricted by backhaul delay or overhead.

Figure 12:
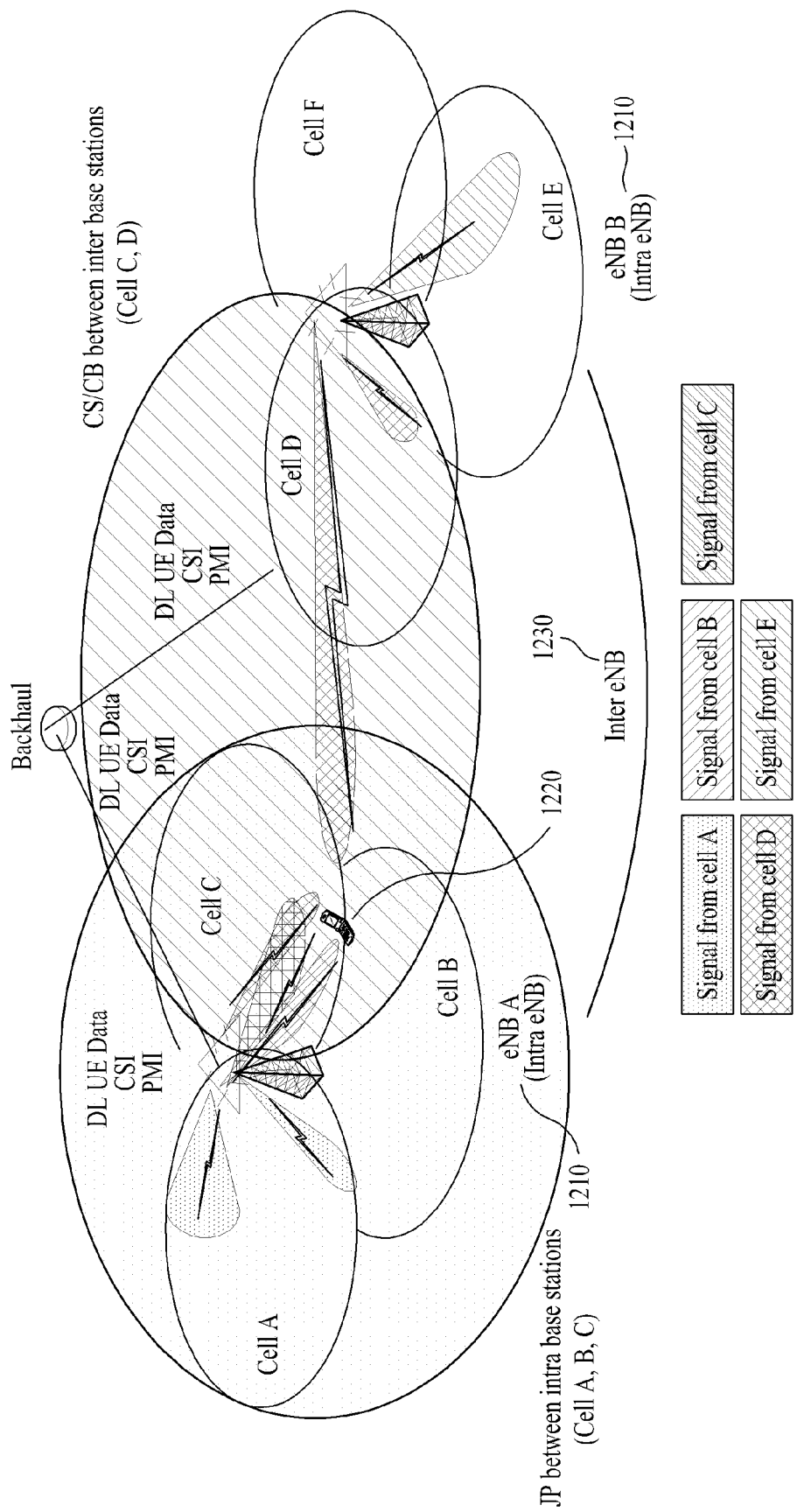
FIG. 12 is a diagram illustrating a CoMP operation according to the present invention.

FIG. 12 is a diagram illustrating a CoMP operation according to the present invention.

Referring to FIG. 12, cells A, B and C in intra base station may be operated with a cell edge user equipment 1220 in accordance with the joint processing scheme, and cell D which is inter base station 1230 relation with the cell edge user equipment 1220 may be operated with the cell edge user equipment 1220 in accordance with the cooperative scheduling/beamforming scheme. In this way, the user equipment may perform different CoMP operations per cell that performs the CoMP operation. To this end, a plurality of downlink component carriers based on aggregation of a series of carriers may be used for transmission. A random specific one of the plurality of downlink component carriers may be dedicated for a specific CoMP scheme. As a result, a different CoMP scheme may be applied to the other component carriers. This will be described with reference to the accompanying drawings. When cells that perform several CoMP operations are operated with the cell edge user equipment in accordance with different CoMP schemes at the same time, the CoMP operations will be described depending on the CoMP zone based on the CoMP scheme.

Figure 13:
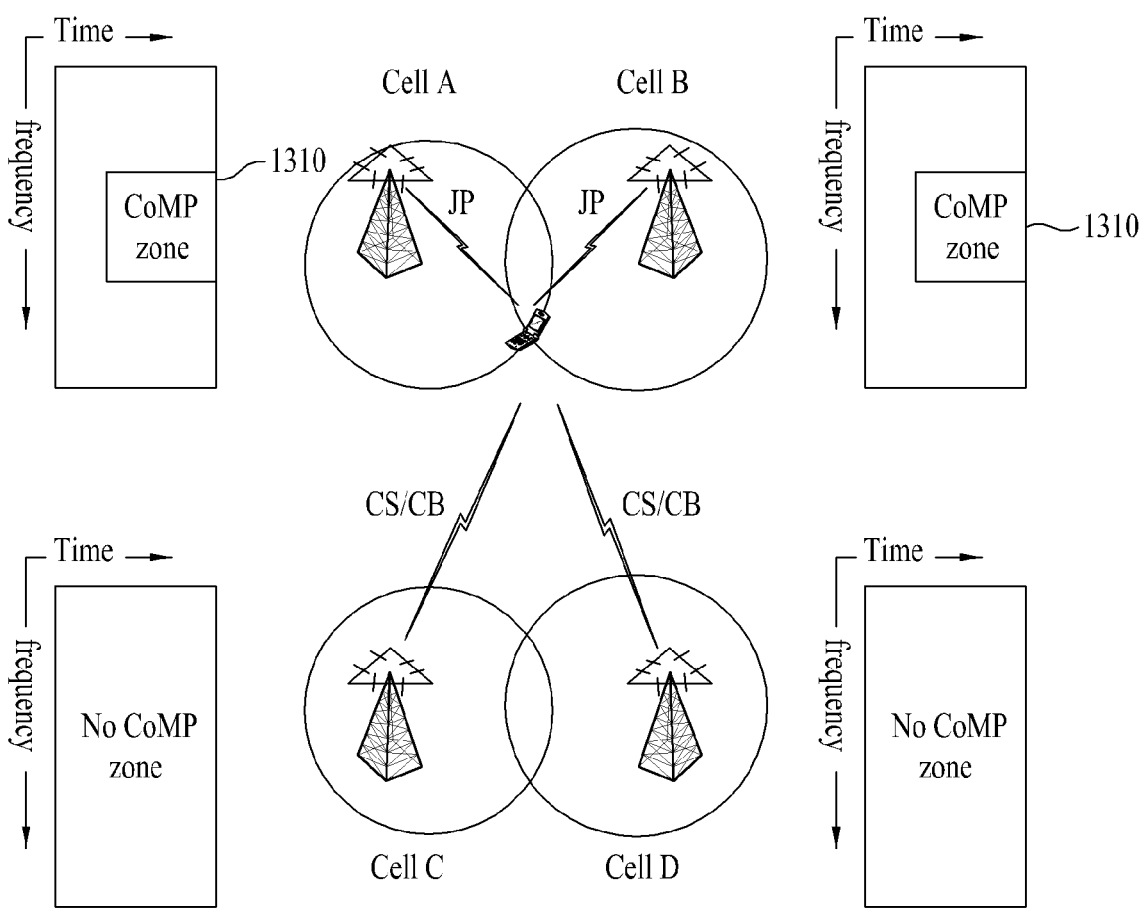
FIG. 13 to FIG. 15 are diagrams illustrating an example of a method for allocating a CoMP zone when a user equipment performs a CoMP scheme different from that of a cell.
Figure 14:
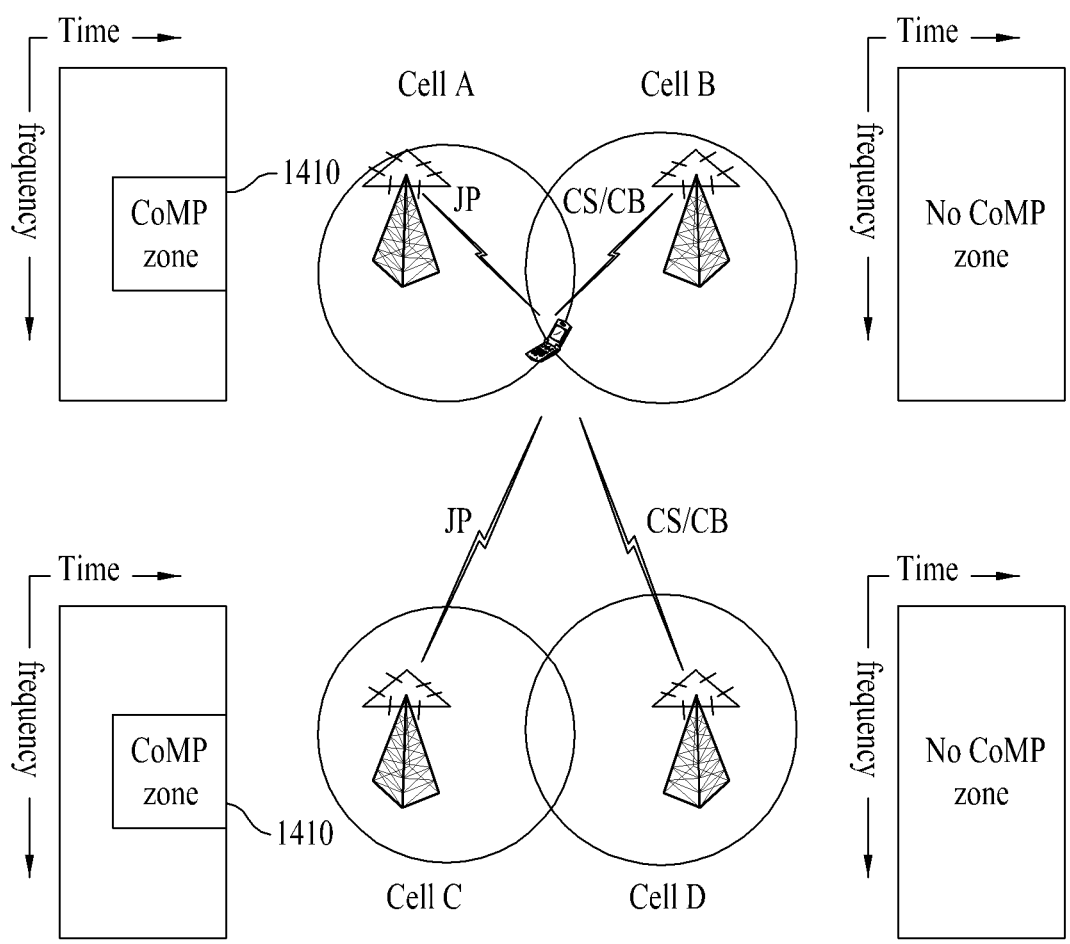
Figure 15:
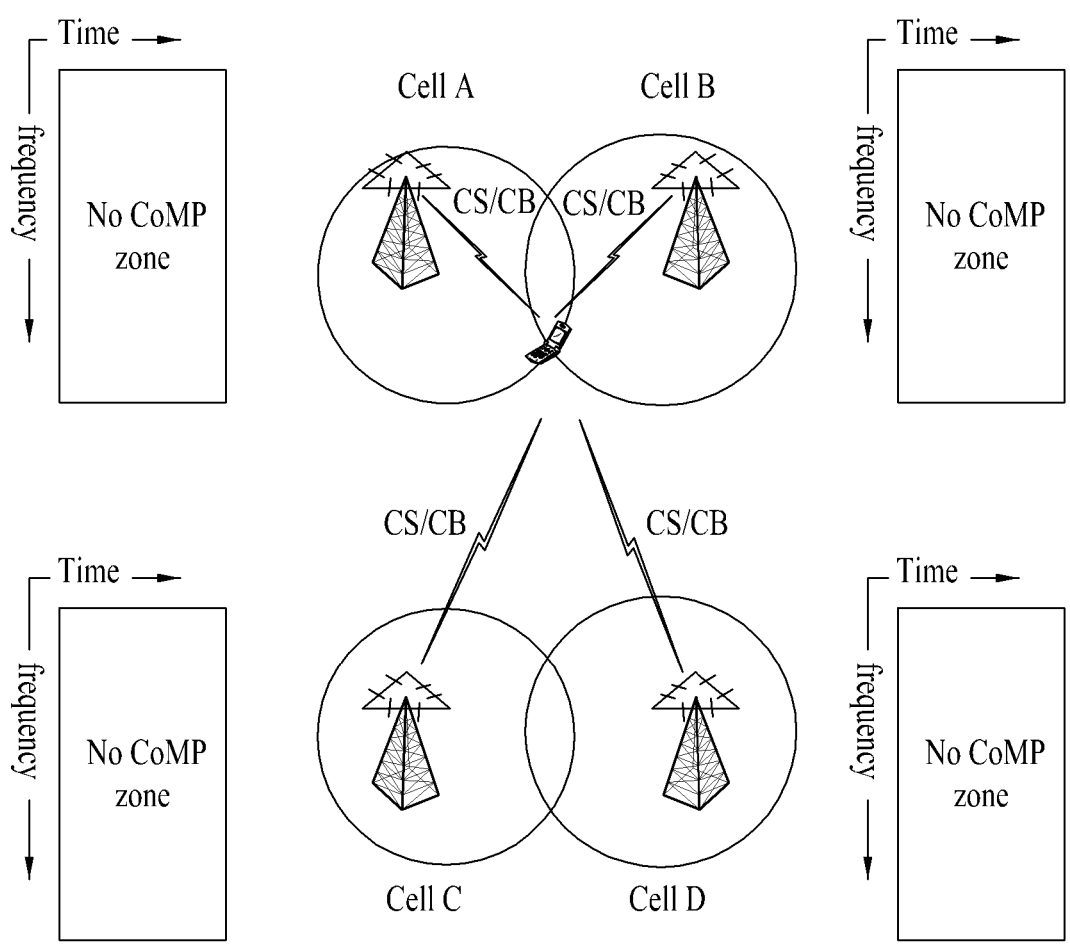

FIG. 13 to FIG. 15 are diagrams illustrating an example of a method for allocating a CoMP zone when a user equipment performs a CoMP scheme different from that of a cell.

Referring to FIG. 13 to FIG. 15, it is considered that four cells A, B, C and D configure one CoMP set, and perform the CoMP operation with the user equipment located at the edge of cell A. As shown in FIG. 13, if the joint processing (JP) scheme is performed in accordance with the CoMP scheme, the CoMP zone is set up. If the cooperative scheduling/beamforming (CS/CB) scheme is performed, the CoMP zone may not be set up.

For the CoMP set which is a set of cells that perform the CoMP operation, the cells operated in accordance with the joint processing (JP) scheme may set up the same CoMP zone 1310 as that of the serving cell (cell A). Neighboring cells that perform the joint processing (JP) scheme with the serving cell may share data information for the cell edge user equipment and transmit data to the user equipment by using the set specific CoMP zone. In other words, the cell A and the cell B may provide a transmission service of a desirable signal to the user equipment.

However, neighboring cells that perform the cooperative scheduling/beamforming (CS/CB) scheme do not need to allocate the CoMP zone. For example, in case of PMI restriction which is one of the cooperative scheduling scheme, the neighboring cells may reduce interference by restricting a specific PMI to be restricted by the cell edge user equipment of the other neighboring cells at entire frequency bands or a specific frequency band. In other words, the cell C and the cell D reduce interference by restricting a specific beam pattern that causes interference to the edge user equipment of the cell A without setting up a CoMP zone. In this case, a separate CoMP zone is not required.

If a neighboring cell within the CoMP set, which performs the joint processing (JP) scheme, is operated in accordance with the cooperative scheduling/beamforming (CS/CB) scheme, the CoMP zone is shut down to allow the user equipment within the cell to use the corresponding region, whereby efficiency in resource utility can be improved considerably.

Also, as the CoMP zone is set up, overhead based on feedback information transmission and scheduling overhead may be reduced.

In the mean time, as shown in FIG. 14, it is assumed that the cell B which performs the joint processing (JP) scheme is operated in accordance with the cooperative scheduling/beamforming (CS/CB) scheme and that the cell C which performs the cooperative scheduling/beamforming (CS/CB) scheme is operated in accordance with the joint processing (JP) scheme. In this case, the cell B allocates the existing CoMP zone for the user equipment therein and performs the cooperative scheduling/beamforming (CS/CB) scheme without the CoMP zone. The cell C allocates the same CoMP zone 1410 as that of the cell A which is a serving cell, exchanges and shares data information with the cell A, and performs joint processing by using the corresponding CoMP zone 1410.

As shown in FIG. 15, it is assumed that all the cells belonging to one CoMP set do not perform the joint processing (JP) scheme. In this case, the cells A and C, which have allocated the CoMP zone for the joint processing (JP) scheme in FIG. 14, allocate the CoMP zone for the user equipment therein and perform the cooperative scheduling/beamforming (CS/CB) scheme without using the CoMP zone.

Unlike the aforementioned description, the CoMP zone may be set for both the joint processing (JP) scheme and the cooperative scheduling/beamforming (CS/CB) scheme. At this time, the method for setting up the CoMP zone may be divided into two methods in accordance with the CoMP scheme.

Figure 16:
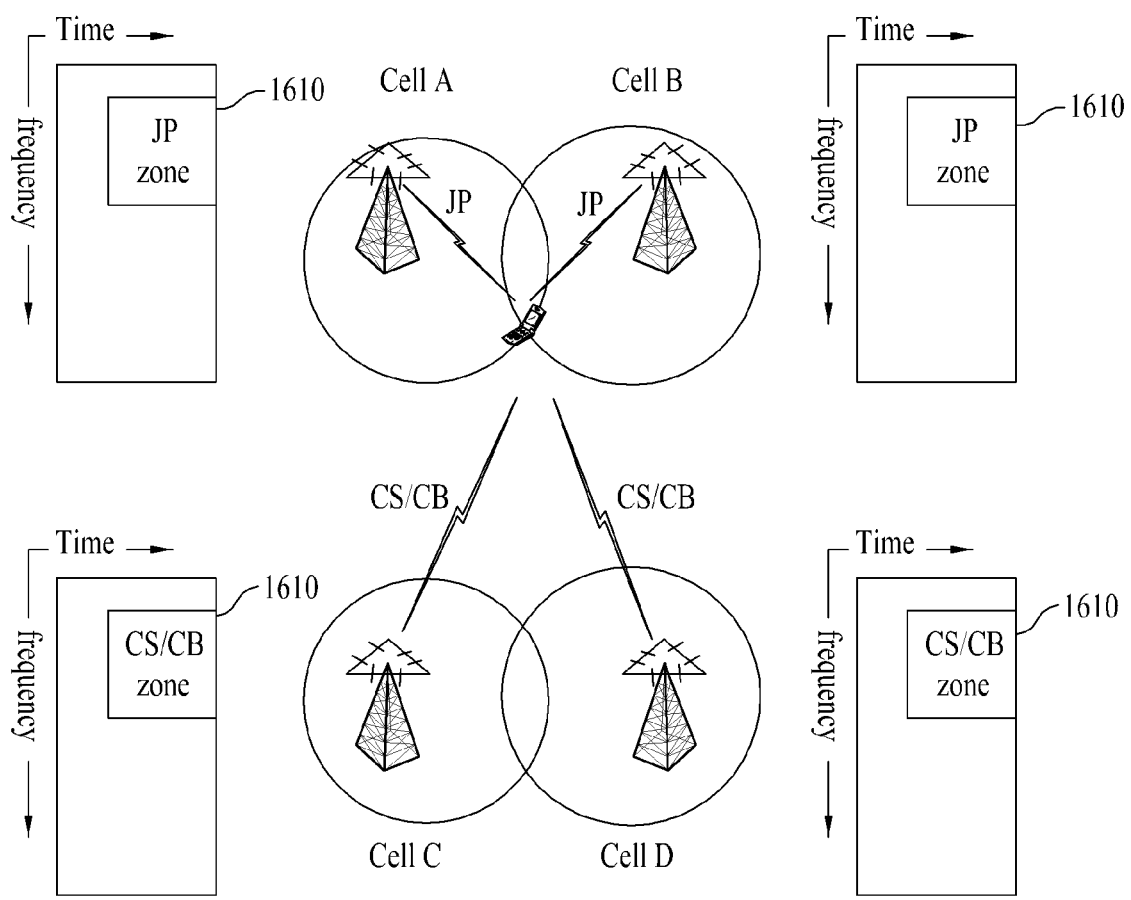
FIG. 16 is a diagram illustrating an example of a method for allocating a CoMP zone when a user equipment performs a CoMP scheme different from that of a cell.

FIG. 16 is a diagram illustrating an example of a method for allocating a CoMP zone when a user equipment performs a CoMP scheme different from that of a cell.

Referring to FIG. 16, as the first method for allocating the CoMP zone in accordance with the CoMP scheme, the same CoMP zone 1610 may be allocated regardless of the CoMP scheme. In other words, if cells constituting one CoMP set perform the joint processing (JP) scheme, the CoMP zone is allocated as a specific zone for the joint processing (JP) scheme. If the cells constituting one CoMP set perform the cooperative scheduling/beamforming (CS/CB) scheme, the CoMP zone is allocated as a specific zone for the cooperative scheduling/beamforming (CS/CB) scheme. In this way, the CoMP scheme may be performed using the specific zone. In this case, the cell edge user equipment may receive a desirable signal from neighboring cells through the joint processing (JP) scheme while reducing interference from the neighboring cells through the cooperative scheduling/beamforming (CS/CB) scheme by simultaneously performing the joint processing (JP) scheme and the cooperative scheduling/beamforming (CS/CB) scheme for the specific CoMP zone. As a result, performance of the cell edge user equipment may be improved and feedback information transmission overhead and scheduling overhead caused by the CoMP operation may be reduced considerably. As described above, the cells A and B may perform the joint processing (JP) scheme by using the same CoMP zone 1610, and the cells C and D may perform the cooperative scheduling/beamforming (CS/CB) scheme by using the same CoMP zone 1610.

Figure 17:
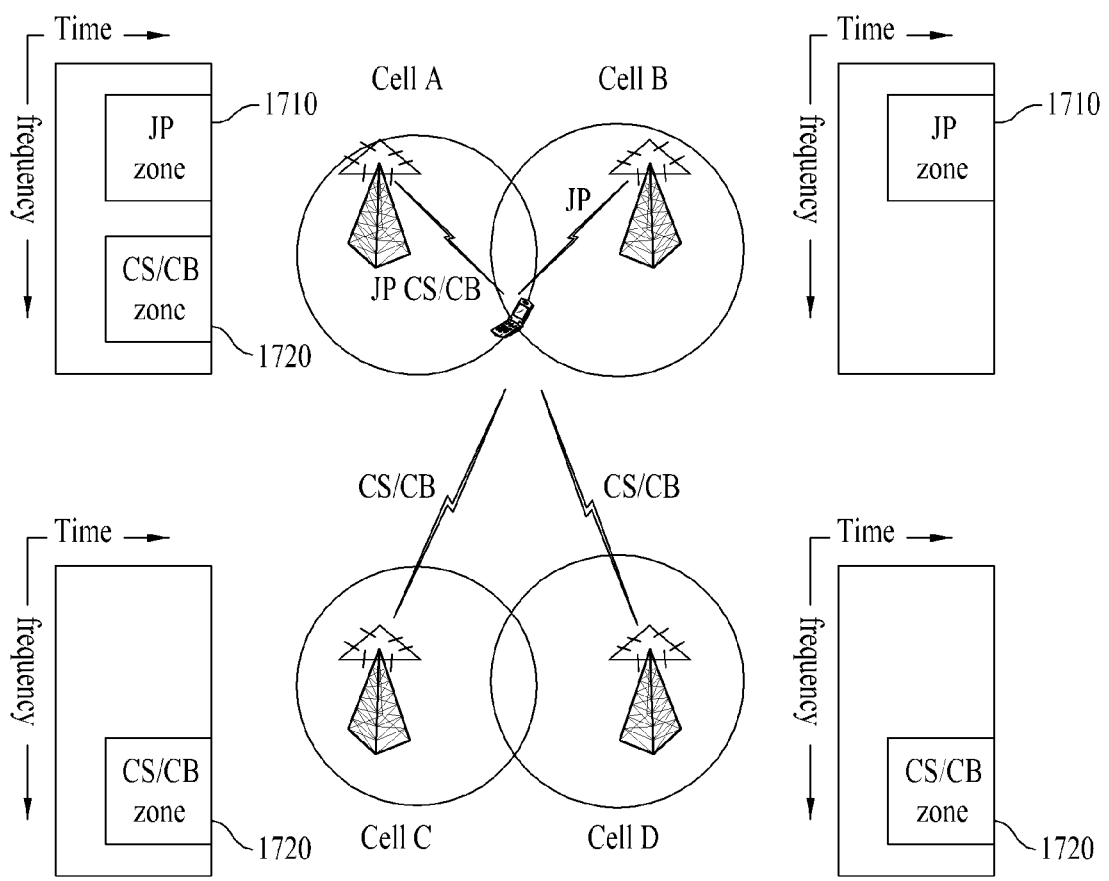
FIG. 17 is a diagram illustrating an example of a method for transmitting a signal using a CoMP zone allocated when a user equipment performs a CoMP scheme different from that of a cell.

FIG. 17 is a diagram illustrating an example of a method for transmitting a signal using a CoMP zone allocated when a user equipment performs a CoMP scheme different from that of a cell.

Referring to FIG. 17, several CoMP zones may be set up in accordance with the CoMP scheme. In other words, a CoMP zone for the joint processing (JP) scheme and a CoMP zone for the cooperative scheduling/beamforming (CS/CB) scheme may be allocated to their respective regions in accordance with their purpose of use. In this case, the user equipment at the edge of the serving cell (cell A) may be allocated with different CoMP zones 1710 and 1720 for the CoMP scheme, and may receive a service through the corresponding CoMP zones 1710 and 1720 in accordance with the CoMP scheme corresponding to the corresponding CoMP zones 1710 and 1720. For example, as shown in FIG. 17, the user equipment at the edge of the cell A may perform the joint processing (JP) scheme with the cells A and B by using the joint processing zone 1710, and the cells A, B and C may perform the cooperative scheduling/beamformign (CS/CB) scheme with the cell edge user equipment by using the cooperative scheduling/beamforming (CS/CB) zone 1720.

Figure 18:
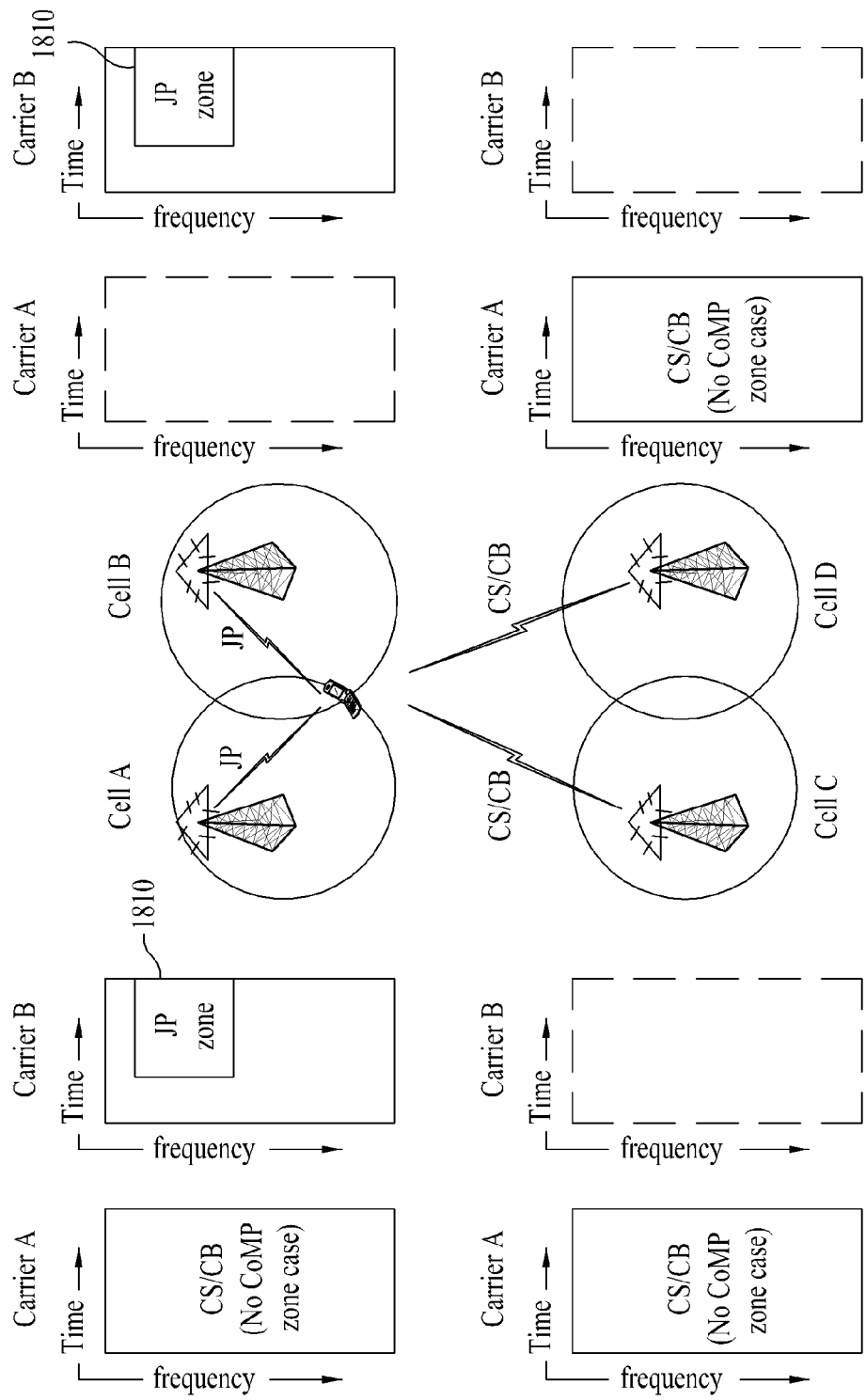
FIG. 18 and FIG. 19 are diagrams illustrating an example of a method for transmitting a signal using a CoMP zone to a plurality of carriers when a user equipment performs a CoMP scheme different from that of a cell.
Figure 19:
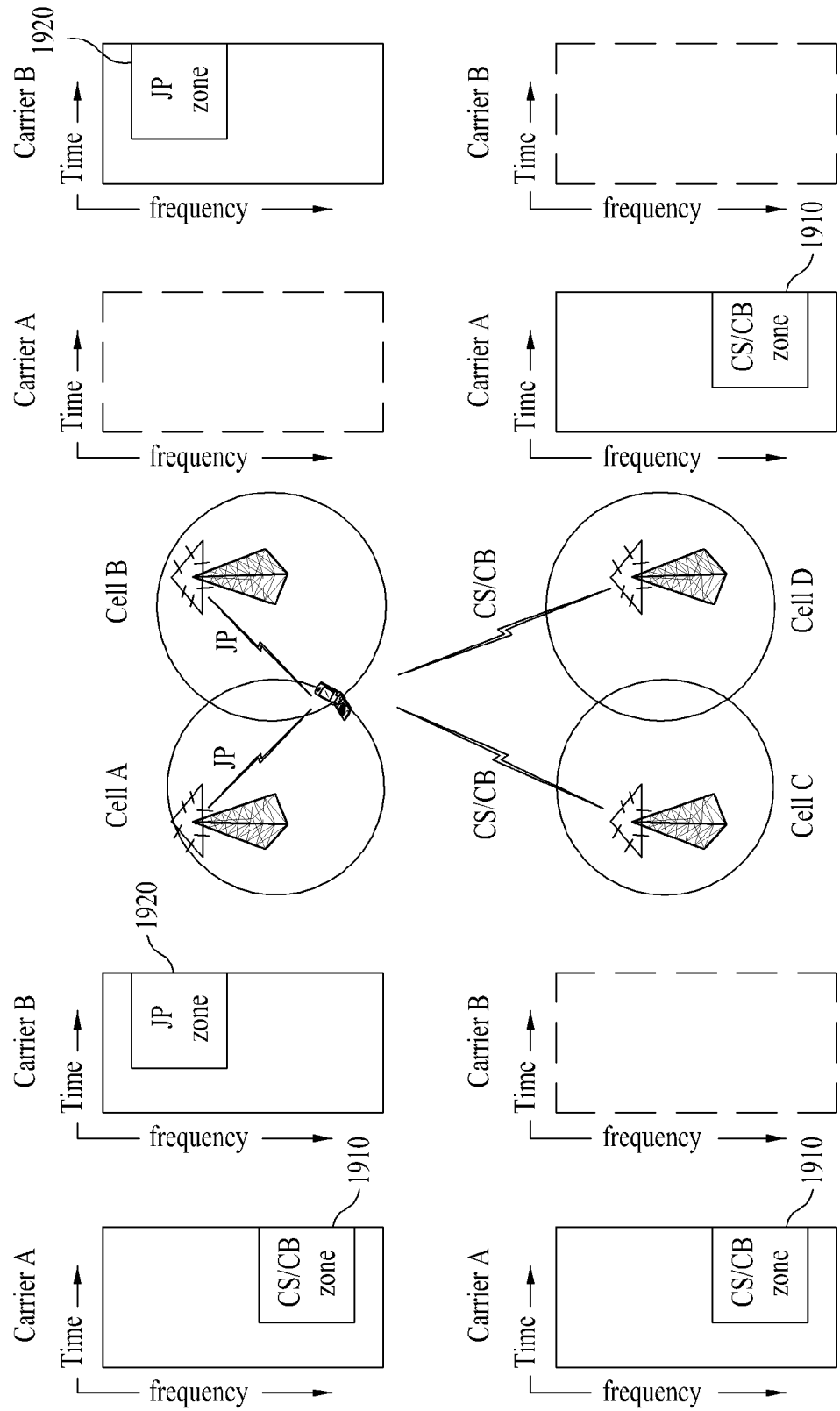

FIG. 18 and FIG. 19 are diagrams illustrating an example of a method for transmitting a signal using a CoMP zone to a plurality of carriers when a user equipment performs a CoMP scheme different from that of a cell.

Referring to FIG. 18, if transmission is performed in a unit of a plurality of downlink component carriers based on carrier aggregation, a random component carrier may be dedicated for a specific CoMP scheme, and another CoMP scheme may be used for the other downlink component carriers. For example, as shown in FIG. 18, neighboring cells (cells A and B) may perform the joint processing (JP) scheme with the cell edge user equipment by using a CoMP zone 1810 allocated to a carrier B. Neighboring cells (cells C and D) operated in accordance with the cooperative scheduling/beamforming (CS/CB) scheme may perform the CoMP operation at a carrier A. At this time, the method for signal transmission may be divided into the example of FIG. 18 and the example of FIG. 19 depending on whether the COMP zone for the cooperative scheduling/beamforming (CS/CB) scheme is allocated. In other words, the CoMP zone for the cooperative scheduling/beamforming (CS/CB) scheme may not be allocated separately as shown in FIG. 18, and the CoMP zone 1910 for the cooperative scheduling/beamforming (CS/CB) scheme may be allocated separately as shown in FIG. 19. In this way, the CoMP zones 1910 and 1920 allocated to each carrier depending on the CoMP scheme may be allocated to different regions per carrier or may be allocated to the same region.

Figure 20:
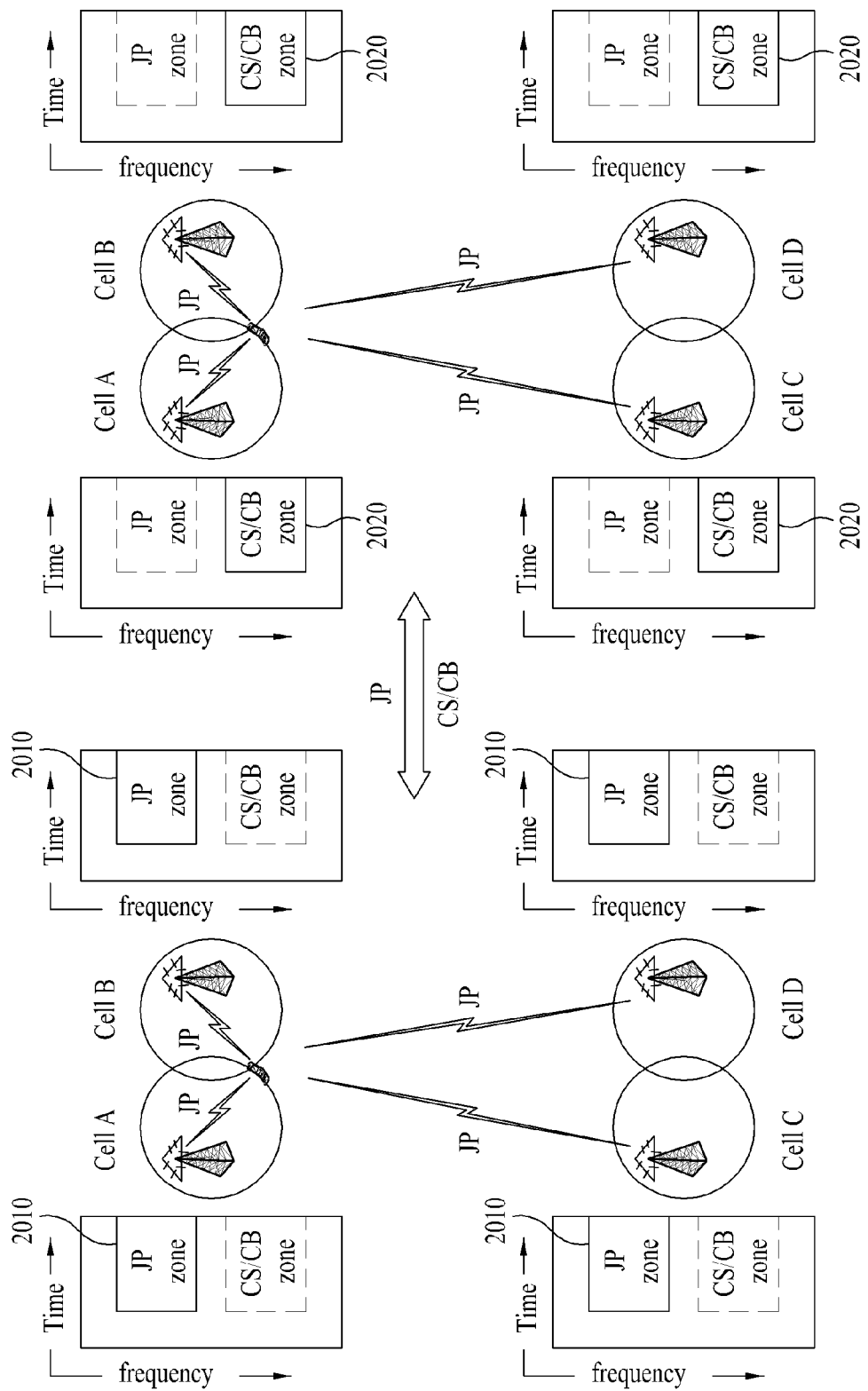
FIG. 20 is a diagram illustrating an example of a method for transmitting a signal using a CoMP zone allocated when a user equipment performs a CoMP scheme different from that of a cell.

FIG. 20 is a diagram illustrating an example of a method for transmitting a signal using a CoMP zone allocated when a user equipment performs a CoMP scheme different from that of a cell.

As shown in FIG. 20, it is assumed that user equipment located at the cell edge performs the CoMP operation with neighboring cells in accordance with one CoMP scheme at one time instead of different CoMP schemes operated at the same time. In (a) of FIG. 20, cells that perform the CoMP operation are operated in accordance with the joint processing (JP) scheme only. In (b) of FIG. 20, the cells that perform the CoMP operation are operated in accordance with the cooperative scheduling/beamforming (CS/CB) scheme only.

At this time, it may be considered that a CoMP zone for the joint processing (JP) scheme is allocated and a CoMP zone for the cooperative scheduling/beamforming (CS/CB) scheme is not allocated separately. If cells (cells A, B, C and D) in one CoMP set perform the joint processing (JP) scheme by using the same CoMP zone 2010, and the cell edge user equipment may measure the channel status of the corresponding CoMP zone 2010 and transmit the measured result to a serving base station (cell). If the cells A, B, C and D in the CoMP set, which are performing the joint processing (JP) scheme, are operated in accordance with the cooperative scheduling/beamforming (CS/CB) scheme, the cells may perform the cooperative scheduling/beamforming (CS/CB)

scheme by using the allocated specific CoMP zone 2020. At this time, the respective cells may allocate the CoMP zone 2010 allocated for the joint processing (JP) scheme, for the other user equipments therein. Also, if the cells perform the cooperative scheduling/beamforming (CS/CB) scheme, they may perform the CoMP operation without separate CoMP zone.

Furthermore, the CoMP zone 2010 for the joint processing (JP) scheme and the CoMP zone 2020 for the cooperative scheduling/beamforming (CS/CB) scheme may be allocated to their respective regions in accordance with their purpose of use. At this time, if carrier aggregation is used, the CoMP zone may be set up carrier-wise or in accordance with a subband granularity mode in the carrier.

For example, if the joint processing (JP) scheme is performed, the respective cells in the CoMP set may allocate and use the CoMP zone 2010 for the joint processing (JP) scheme, which is previously defined. At this time, the CoMP zone 2020 for the cooperative scheduling/beamforming (CS/CB) scheme is allocated for the user equipment within the cells. Next, if the cooperative scheduling/beamforming (CS/CB) scheme is performed, the respective cells may allocate the CoMP zone 2020 for the cooperative scheduling/beamforming (CS/CB) scheme, for the cell edge user equipment. At this time, the CoMP zone 2010 for the joint processing (JP) scheme is allocated for the user equipment within the cells. In this way, the plurality of CoMP zones 2010 and 2020 may be allocated for each CoMP scheme. As the CoMP zone is set up and used as above, overhead caused by feedback information transmission and scheduling overhead may be reduced, and the CoMP operation may be performed more efficiently.

Figure 21:
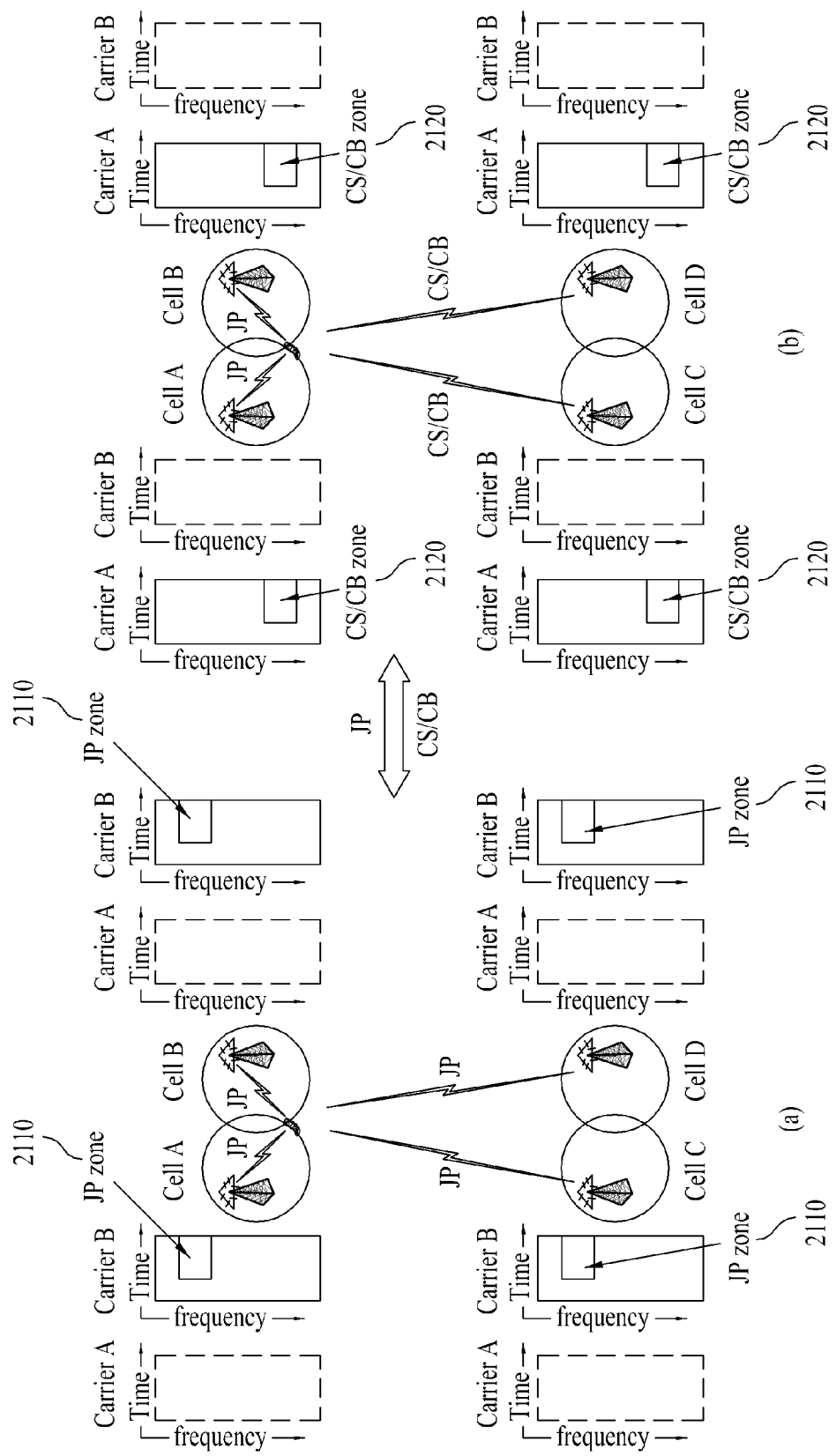
FIG. 21 is a diagram illustrating an example of a method for transmitting a signal using a CoMP zone to a plurality of carriers when a user equipment performs a CoMP scheme with a cell that performs a CoMP operation.

FIG. 21 is a diagram illustrating an example of a method for transmitting a signal using a CoMP zone to a plurality of carriers when a user equipment performs a CoMP scheme with a cell that performs a CoMP operation.

Referring to FIG. 21, a plurality of downlink component carriers based on carrier aggregation may be used for transmission. At this time, if a specific component carrier is dedicated for a specific CoMP scheme, another CoMP scheme may be used for the other downlink component carriers. If one specific CoMP scheme is used for one cell edge user equipment, a random specific CoMP scheme may be defined for a plurality of downlink component carriers, and the user equipment may select a specific carrier in accordance with the CoMP scheme. For example, as shown in (a) of FIG. 21, neighboring cells (cells A, B, C and D) operated in accordance with the joint processing (JP) scheme may allocate a CoMP zone 2110 for the joint processing (JP) to the carrier B, and may perform signal transmission and reception by using the CoMP zone 2110. On the other hand, as shown in (b) of FIG. 21, the neighboring cells (cells A, B, C and D) operated in accordance with the cooperative scheduling/beamforming (CS/CB) scheme may allocate the CoMP zone 2120 for the cooperative scheduling/beamforming (CS/CB) scheme to a carrier A which is a specific carrier, and may perform signal transmission and reception by using the CoMP zone 2120. The user equipment may perform the CoMP operation by being allocated with the corresponding carrier in accordance with the CoMP scheme.

As described above, although FIG. 20 illustrates that the CoMP zone for the cooperative scheduling/beamforming (CS/CB) scheme is allocated separately, it may be considered that the CoMP zone for the cooperative scheduling/beamforming (CS/CB) scheme is not allocated separately. The CoMP zones allocated to each carrier depending on the CoMP scheme may be allocated to different regions (for example, different frequency bands) per carrier or may be allocated to the same region (for example, same frequency band).

When the user equipment located at the cell edge performs the CoMP operation with neighboring cells, the serving base station should notify the user equipment of physical resource block (PRB) information on the allocated CoMP zone if the cells are operated in accordance with different CoMP schemes at the same time. For example, in case of the method for allocating a CoMP zone shown in FIG. 13, the serving base station may notify the user equipment of PRB information on the CoMP zone where the joint processing (JP) scheme is performed, and the user equipment may measure the channel status for the joint processing (JP) with respect to the allocated physical resource block, and may feed back the measured result to the serving base station.

Also, in case of the method for allocating a CoMP zone shown in FIG. 16, the serving base station may notify the user equipment of PRB information on the allocated CoMP zone if the CoMP zone for the joint processing (JP) scheme and the CoMP zone for the cooperative scheduling/beamforming (CS/CB) scheme are allocated to the same region (for example, same frequency band). In this case, the user equipment does not need to know information on a CoMP cell which is operated and information on a CoMP scheme of the operated CoMP cell. Also, in case of the method for allocating a CoMP zone shown in FIG. 17, if the CoMP zone for the joint processing (JP) scheme and the CoMP zone for the cooperative scheduling/beamforming (CS/CB) scheme are allocated to different regions and operated at the same time, the serving base station may need to notify the user equipment of physical resource block information on the CoMP zone for the joint processing (JP) scheme and the CoMP zone for the cooperative scheduling/beamforming (CS/CB) scheme. If it is assumed that the joint processing (JP) scheme is performed in a specific transmission mode such as RF combining, the serving base station may notify the user equipment of information as to whether what cell in the CoMP set performs the joint processing (JP) scheme or the cooperative scheduling/beamforming (CS/CB) scheme, in addition to the physical resource block (PRB) information on the CoMP zone.

When the user equipment located at the cell edge performs the CoMP operation with neighboring cells, the serving base station should notify the user equipment of indication information on mode change of the CoMP scheme as well as physical resource block (PRB) information on the allocated CoMP zone if the cells are operated in accordance with one CoMP scheme at one time and allocate different CoMP zones based on the CoMP scheme.

As described above, in case of allocation of the user equipment-specific CoMP zone, the serving base station may not need to notify the user equipment of PRB information on the CoMP zone. In this case, the serving base station may notify the neighboring cells of information on the CoMP scheme, whereby the user equipment may set up the CoMP zone. In other words, in case of the cooperative scheduling/beamforming (CS/CB) scheme that receives a desirable signal from the serving cell, the user equipment may select the CoMP zone having the best channel status (the case where the CoMP zone for the cooperative scheduling/beamforming (CS/CB) scheme is allocated) in the same manner as the method for selecting the best band having the best channel status based on a single cell.

Unlike the above, in case of the joint processing (JP) scheme that performs RF combining, the user equipment may select the best band different from that of a single cell, on the basis of effective CQI that reflects channel status between neighboring cells joining in joint processing, and may set up the selected best band as the CoMP zone.

When the user equipment located at the cell edge performs the CoMP operation with neighboring cells in accordance with different CoMP schemes at the same time, the serving base station may notify the user equipment of information as to whether a neighboring cell, which performs the CoMP operation, is operated in accordance with the joint processing (JP) scheme or the cooperative scheduling/beamforming (CS/CB) scheme, so as to set up a user equipment-specific CoMP zone. If the cell edge user equipment is operated in accordance with one CoMP scheme at one time, the serving base station may notify the user equipment of information on the CoMP scheme currently used to set up the user equipment-specific CoMP zone.

The information on the CoMP zone described above may be transferred from the serving base station to the user equipment through higher layer signaling or L1/L2 control signaling.

The serving base station may transmit the information on the CoMP zone to the user equipment through higher layer signaling. Information on ID of the corresponding neighboring cell that performs the CoMP operation and the number of antennas may be transmitted to the user equipment if necessary. The information on the CoMP zone may be transmitted to the user equipment, which should perform the CoMP operation, at the event-triggered time or periodically.

Generally, the base station may transmit scheduling allocation information and other control information through a PDCCH. The PDCCH may be transmitted to one aggregation or a plurality of consecutive control channel elements (CCEs). One CCE includes nine resource element groups. The number of resource element groups allocated to a physical control format indicator channel (PCFICH) or a physical hybrid automatic repeat request indicator channel (PHICH) is $N_{REG}$. The CCEs available in the system are from 0 to $N_{CCE}-1$ (in this case, $N_{CCE}=\lfloor N_{REG}/9 \rfloor$). The PDCCH supports multiple formats as illustrated in Table 1 below. One PDCCH configured by n number of consecutive CCEs starts from CCE that performs i mod n=0 (in this case, i is a CCE number). The multiple PDCCHs may be transmitted to one subframe.

TABLE 1

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 1, the base station may determine a PDCCH format depending on how many regions the control information should be transmitted. The user equipment may reduce overhead by reading out the control information in a unit of CCE.

The serving base station may notify the user equipment of information on ID of a corresponding neighboring cell and the number of antennas through L1/L2 control signaling. In other words, the serving base station may be designed to identify a PDCCH of a DCI format configured based on the control information. At this time, the DCI format may be configured in such a manner that some fields on a random DCI format are used in view of reuse of the existing DCI format and the other fields are filled with zero padding or arbitrary values.

A method for acquiring information on ID of a neighboring cell, which performs a CoMP operation, in a user equipment will be described. In the LTE system, the user equipment may not know information on a neighboring cell which performs a CoMP operation. However, the user equipment may receive cell ID set information, which includes neighboring cell ID information, from the base station. The user equipment may identify a neighboring cell through cell ID set and a synchronization channel of cells.

In the LTE system, 504 physical cell IDs (PCI) exist. These physical cell IDs are divided into 168 cell ID groups, each of which has three cell IDs. This may be expressed by the following Equation 1.

$$N_{ID}^{cell} = 3N_{ID}^{(1)} + N_{ID}^{(2)} \quad \text{[Equation 1]}$$

In the Equation 1, $N_{ID}^{cell}$ represents the number of physical cell IDs, $N_{ID}^{(1)}$ represents the number of physical cell ID groups, and $N_{ID}^{(2)}$ represents the number of cell IDs within the physical cell ID group.

The user equipment may acquire information on three cell IDs within the cell ID group through a primary synchronization channel of the cells, and may acquire information on 168 cell ID groups through a secondary synchronization channel. The user equipment may identify whether each cell is a neighboring cell, on the basis of cell ID information through synchronization channels of the cells. Also, the user equipment may receive a reference signal per neighboring cell through cell group ID. In other words, the user equipment may acquire sequence information used for pilot signal transmission by each neighboring cell from the synchronization channel of each neighboring cell. If it is determined that each cell is a neighboring cell, the user equipment may continuously monitor a channel quality status.

At this time, a sequence d(n) used as a primary synchronization signal of each neighboring cell may be generated from a Zadoff-Chu sequence in a frequency domain in accordance with the following Equation 2.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 2]}$$

In this case, a Zadoff-Chu root sequence index u may be given as illustrated in the following Table 1.

TABLE 2

| $N_{ID}^{(2)}$ | Root index u |
|---|---|
| 0 | 25 |
| 1 | 29 |
| 2 | 34 |

Table 2 illustrates root indexes for a primary synchronization signal (PSS). A sequence for a primary synchronization signal may be generated in accordance with the root indexes of Table 1.

Also, sequences d(0), . . . , d(61) intended to be used as secondary synchronization signals (SSS) are interleaved concatenation of two length-31 binary sequences. The concatenated sequences are scrambled with predetermined scrambling sequences by the primary synchronization signal.

Combination of the two length-31 binary sequences may define different synchronization signals among subframe 0 to subframe 5 in accordance with the following Equation 3.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 3]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In this case, $0 \le n \le 30$, and indexes $m_0$ and $m_1$ may be generated from a physical layer cell ID group $N_{ID}^{(1)}$ based on the following Equation 4.

$$m_0 = m' \bmod 31 \quad \text{[Equation 4]}$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor, q' = \lfloor N_{ID}^{(1)}/30 \rfloor$$

The synchronization channel sequences generated as above may be mapped into a resource region and then may be transmitted to the user equipment. The user equipment may acquire neighboring cell ID information in accordance with the aforementioned description by receiving the synchronization channel. Next, a method for acquiring ID information on a neighboring cell, which performs a specific CoMP scheme, in a user equipment will be described. When neighboring cells within the CoMP set are operated with the cell edge user equipment at the same time in accordance with different CoMP schemes, the serving base station may implicitly or explicitly notify the user equipment of information on neighboring cell ID, if a CoMP scheme in which a corresponding neighboring cell is operated should be notified. At this time, explicit notification means that the user equipment may directly identify the information through a channel, and implicit notification means that the user equipment may infer the information through association with other information.

As a method of explicit notification, 1) a relation based on a CoMP scheme may previously be set within a cell region (for example, PLMN (Public Land Mobile Network) unit) where several cells are grouped, or the relation may be notified to the user equipment through a broadcast channel (BCH), user equipment-specific control signaling or higher layer signaling.

As another method of explicit notification, 2) the user equipment may receive information on cell ID set, which performs the joint processing (JP) scheme, from the serving base station. At this time, the cell ID set information may be cell group ID or base station ID (eNB ID). The user equipment may determine neighboring cell IDs, which are not included in the cell ID set, as those which do not perform the joint processing (JP), on the basis of the cell ID set information received from the serving base station.

As still another method of explicit notification, 3) after cell group ID is deployed as base station ID, the corresponding cell may signal to the user equipment that cell group ID has been deployed as base station ID, through a broadcast channel or higher layer signaling.

For example, it is assumed that 504 physical cell IDs (PCI) include 168 cell group IDs, each of which includes three cell IDS. At this time, 1 bit information may be used as a cell coordination indicator. Cell group ID and base station ID are deployed equally, whereby one of 1 bit information may be used as an information indicator that performs cell-coordination such as allocation of three cell IDs within one cell group ID to each sector. The other of 1 bit information may be used as an information indicator that does not perform coordinated deployment.

As further still another method of explicit notification, 4) the user equipment may directly receive information cell ID set, which performs the joint processing (JP) scheme with the user equipment, and cell ID set, which performs the cooperative scheduling/beamforming (CS/CB) scheme, from the serving base station.

Next, as a method of implicit notification, 1) a CoMP scheme may previously be defined for base station ID and sector ID, whereby the base station ID and the sector ID may be deployed and used in accordance with the defined CoMP scheme. For example, the base station ID may be cell group IDs (168 IDs), and the sector ID may be cell IDs (three IDs) within one group ID. In other words, the user equipment may identify a CoMP operation performed by the corresponding cell by inferring additional information through association with other information without directly receiving cell ID information from a neighboring cell.

As another method of implicit notification, 2) the information in the aforementioned explicit notification methods may previously be defined, whereby the user equipment may identify a neighboring cell that uses a specific CoMP scheme, through inference on the basis of the information described in the explicit notification methods.

Figure 22:
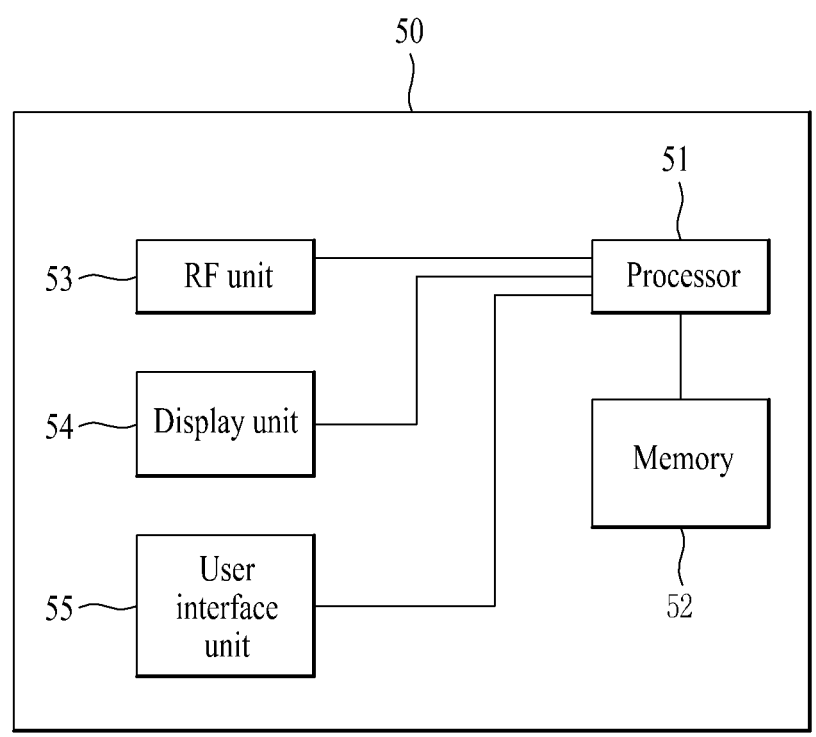
FIG. 22 is a diagram illustrating elements of a device 50.

FIG. 22 is a diagram illustrating elements of a device 50. This device 50 may be the user equipment or the base station. Also, the device 50 includes a processor 51, a memory 52, a radio frequency (RF) unit 53, a display unit 54 and a user interface unit 55. Layers of a physical interface protocol are implemented in the processor 51. The processor 51 provides a control plane and a user plane. A function of each layer may be implemented in the processor 51. The processor 51 may include a contention resolution timer. The memory 52 is connected with the processor 51 and stores an operating system, an application, and general files therein. If the device 50 is the user equipment (UE), the display unit 54 may display various kinds of information, and LCD (Liquid Crystal Display), OLED (Organic Light Emitting Diode), etc., which are known, may be used as the display unit 54. The user interface unit 55 may be configured by combination of well known user interfaces such as key pad and touch screen. The RF unit 53 is connected with the processor 51 and may transmit or receive a radio signal to and from the processor 51. The RF unit 53 may include a transmission module (not shown) and a reception module (not shown). The RF unit 53 receives control information, which includes zone allocation information, from the base station, and the processor 51 controls the user equipment 50 to perform communication with the base station through the corresponding zone on the basis of the zone allocation information.

Layers of a radio interface protocol between the user equipment and a network may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the network exchange RRC message with each other through the RRC layer.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention can be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The method for signal transmission in a CoMP scheme of a user equipment according various embodiments of the present invention is applicable to 3GPP LTE, LTE-A, and IEEE 802.16, which are examples of a wireless mobile communications system.

The invention claimed is:

1. A method for transmitting a signal at a user equipment (UE) using a coordinated multi-point (CoMP) scheme, the method comprising:

receiving, from a serving base station, information regarding a plurality of carriers of the serving base station including a first carrier and a second carrier or a plurality of CoMP time-frequency resource sets of the serving base station including a first CoMP time-frequency resource set of the serving base station and a second CoMP time-frequency resource set of the serving base station, wherein the plurality of carriers or the plurality of CoMP time-frequency resource sets of the serving base station are respectively allocated for a plurality of CoMP schemes including a first CoMP scheme for joint processing (JP) and a second CoMP scheme for coordinated scheduling/coordinated beamforming (CS/CB); and transmitting a signal using at least one of the plurality of CoMP schemes via at least one of the plurality of allocated carriers or at least one of the plurality of allocated CoMP time-frequency resource sets of the serving base station, wherein the first carrier or the first CoMP time-frequency resource set of the serving base station is allocated for the first CoMP scheme, and wherein the second carrier or the second CoMP time-frequency resource set of the serving base station is allocated for the second CoMP scheme.

2. The method according to claim 1, wherein the UE transmits a first signal based on the first CoMP scheme using the first carrier among the plurality of allocated carriers, and transmits a second signal based on the second CoMP scheme using the second carrier among the plurality of allocated carriers.

3. The method according to claim 1, wherein the UE transmits a first signal based on the first CoMP scheme using the first CoMP time-frequency resource set in the first carrier among the plurality of allocated carriers, and transmits a second signal based on the second CoMP scheme using the second CoMP time-frequency resource set in the second carrier among the plurality of allocated carriers.

4. The method according to claim 1, wherein the UE transmits signals based on the first and second CoMP schemes using a full band of the plurality of allocated carriers.

5. The method according to claim 1, wherein the UE transmits a first signal based on a first CoMP scheme using a first zone in a specific carrier of the plurality of allocated carriers, and transmits a second signal based on a second CoMP scheme using a second CoMP time-frequency resource set in the specific carrier.

6. The method according to claim 5, wherein a frequency band of the first CoMP time-frequency resource set is different from that of the second CoMP time-frequency resource set.

7. The method according to claim 1, wherein the UE transmits a first signal based on the first CoMP scheme using a specific frequency band in the first carrier of the plurality of allocated carriers, and transmits a second signal based on the second CoMP scheme using a full band of the second carrier.

8. The method according to claim 1, wherein the UE transmits a first signal based on the first CoMP scheme using a specific frequency band of the first carrier of the plurality of allocated carriers, and transmits a second signal based on the second CoMP scheme using a full band of the second carrier of the plurality of allocated carriers.

9. A user equipment (UE) for transmitting a signal in a wireless communication in accordance with a CoMP scheme, the UE comprising:

a receiver receives, from a serving base station, information regarding a plurality of carriers of the serving base station including a first carrier and a second carrier or a plurality of CoMP time-frequency resource sets of the serving base station including a first CoMP time-frequency resource set of the serving base station and a second CoMP time-frequency resource set of the serving base station, wherein the plurality of carriers or the plurality of CoMP time-frequency resource sets of the serving base station are respectively allocated for a plurality of CoMP schemes including a first CoMP scheme for joint processing (JP) and a second CoMP scheme for coordinated scheduling/coordinated beamforming (CS/CB); and a transmitter transmits a signal in accordance with at least one of the plurality of CoMP schemes using at least one of the plurality of allocated carriers or at least one of the plurality of allocated CoMP time-frequency resource sets of the serving base station, wherein the first carrier or the first CoMP time-frequency resource set of the serving base station is allocated for the first CoMP scheme, and wherein the second carrier or the second CoMP time-frequency resource set of the serving base station is allocated for the second CoMP scheme.

10. The UE according to claim 9, wherein the transmitter transmits a first signal based on the first CoMP scheme using the first carrier among the plurality of allocated carriers, and transmits a second signal based on the second CoMP scheme using the second carrier among the plurality of allocated carriers.

11. The UE according to claim 9, wherein the transmitter transmits a first signal based on the first CoMP scheme using the first CoMP time-frequency resource set in the first carrier among the plurality of allocated carriers, and transmits a second signal based on the second CoMP scheme using the second CoMP time-frequency resource set in the second carrier among the plurality of allocated carriers.

12. The UE according to claim 9, wherein the transmitter transmits signals of the first and second CoMP schemes by using a full band of the plurality of allocated carriers.

* * * * *